(12) United States Patent
Cordero et al.

(10) Patent No.: US 8,989,700 B2
(45) Date of Patent: Mar. 24, 2015

(54) METHOD AND SYSTEM FOR AN INTERACTIVE COMMUNITY ALERT NETWORK

(71) Applicant: The Cordero Group, Lyndhurst, NJ (US)

(72) Inventors: Jose M. Cordero, Livingston, NJ (US); Tamer Zakhary, Union Township, NJ (US)

(73) Assignee: The Cordero Group, Lyndhurst, NJ (US)

( * ) Notice: Subject to any disclaimer, the term of this patent is extended or adjusted under 35 U.S.C. 154(b) by 110 days.

(21) Appl. No.: 13/714,959

(22) Filed: Dec. 14, 2012

(65) Prior Publication Data

US 2013/0157612 A1  Jun. 20, 2013

Related U.S. Application Data

(60) Provisional application No. 61/578,063, filed on Dec. 20, 2011.

(51) Int. Cl.
| | |
|---|---|
| *H04M 11/04* | (2006.01) |
| *H04W 4/22* | (2009.01) |
| *H04N 5/232* | (2006.01) |
| *H04N 7/18* | (2006.01) |

(52) U.S. Cl.
CPC .............. *H04W 4/22* (2013.01); *H04N 5/23238* (2013.01); *H04N 7/181* (2013.01)

USPC ................. 455/404.2; 455/404.1; 455/414.1; 455/456.1; 455/421

(58) Field of Classification Search
CPC ...... H04W 4/22; H04W 76/007; H04W 64/00
USPC .............. 455/404.2, 404.1, 414.1, 456.1, 421
See application file for complete search history.

(56) References Cited

U.S. PATENT DOCUMENTS

| | | | |
|---|---|---|---|
| 2011/0143707 A1* | 6/2011 | Darby et al. ................ | 455/404.2 |
| 2011/0282542 A9* | 11/2011 | Nielsen et al. .................. | 701/33 |

* cited by examiner

*Primary Examiner* — Nghi H Ly
(74) *Attorney, Agent, or Firm* — Arent Fox LLP

(57) ABSTRACT

An interactive community alert network (iCan) system is operable to receive one or more signals indicating a report of an incident. The iCan system may determine a location of the reported incident. One or more visual and/or audio capture devices, which may be within proximity of the determined location of the reported incident may be adjusted. Corresponding visual and/or audio content of the reported incident may be captured and utilized to determine how to handle the reported incident. The location of the reported incident may be determined based on a position of a device and based on a global navigation satellite system position of a device utilized to report the incident. The location of the incident may also be determined based on information within the report of the incident and/or based on localization through use of one or more electronic mapping systems and/or panoramic still images of camera views.

24 Claims, 49 Drawing Sheets

Police Alert Page – Appears on both police and resident sites

Blog Page – Appears on both police and resident sites

You are logged in as copuser1 | logout     Home | Alerts | Blogs | Reports | Contact Us

Recent Blogs

Hello World    (6 replies)

Blog Details

Title
Hello World

Post      Delete Blog
Blog 1

Comment

- user1: 2011-11-16 21:55:31: wfsadfsad
- user1: 2011-11-16 21:55:40: user 2 2nd comment
- user2: 2011-11-17 01:35:44: Hello World!
- user2: 2011-11-17 01:36:18: how are you ...
- copuser1: 2011-11-17 08:22:32: I'm doing fine, thx
- copuser1: 2011-11-17 08:23:44: I'm doing ok too

Enter Comment: [ ]

[COMMENT]

Enter Username: [ ]

[SEND]

FIG. 7 iCan Alert Activity Report – Appears on both police and user sites

You are logged in as copuser1 | logout    Home | Alerts | Blogs | Reports | Contact Us Week ▾    View Report iCan Activity

| Type | Number |
|---|---|
| iCan Reported Incidents | 19 |
| iCan Reported Incidents acknowledged by the Police | 16 |
| Average iCan Incident Police Response (minutes) | 38 |
| iCan alerts acknowledged within One minute | 7 |
| iCan alerts acknowledged between two and five minutes | 5 |
| iCan alerts acknowledged after five minutes | 28 | iCan Alert Categories

| iCan Incident Category | Number |
|---|---|
| Suspicious activity | 11 |
| Crime in Progress | 7 |
| Quality of Life | 1 |
| Person in need of assistance | 0 |
| Others | 0 | iCan Alert Disposition

| Police Action Taken | Number |
|---|---|
| Arrest | 3 |
| Summons issued | 1 |
| Field Interview Report | 1 |
| Incident Report | 0 |
| Warning issued | 1 |
| Other Police Enforcement Action (Narrative Box) | 0 |
| Intelligence Report | 0 |
| No Police Action Warranted | 0 |

FIG. 8

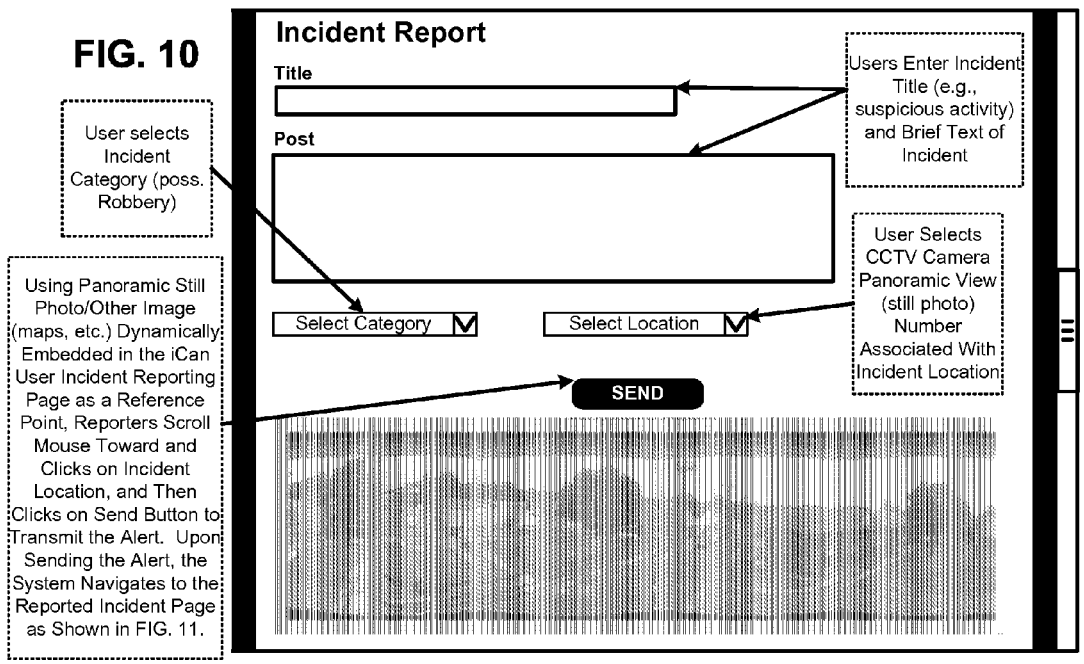

Resident Alert Monitoring Page

| You are logged in as user2 | logout | Home | Report Incident | Alerts | Blogs | Reports | Helpful Links | Contact Us |

Reported Incidents

12/12/2012 | 02:03 pm    Suspicious activity

11/30/2012 | 05:24 pm    feet,11.30.2012

11/27/2012 | 11:14 am    Assault3

11/07/2012 | 11:07 am    Assault3

> Record of Newly Reported Alert (e.g., Black text indicates the police have acknowledge the alert). Previously Reported Alerts Appear Below > Display of Interactive Communication and Collaboration Between Reporter and Police/Security Officer During the Investigation of the Event.

> Record of Alert Conclusion and Outcome

Incident Detail

Suspicious activity
Two men looking into parked cars. One is wearing a green hat, tan waist length jacket and black boots.

- Police: 12/12/2012 | 02:04 pm >> Thank you for the alert. We are currently investigating this matter.
- User: 12/12/2012 | 02:05 pm >> They just moved to the middle of the block.
- Police: 12/12/2012 | 02:06 pm >> We are observing them. Thank you.
- User: 12/12/2012 | 02:07 pm >> I see a police car has arrived Tell the officers to look in the lobby of grey building behind them.
- Police: 12/12/2012 | 02:08 pm >> The officers are entering the building now.
- Police: 12/12/2012 | 02:10 pm >> Which cars were they looking into?
- User: 12/12/2012 | 02:11 pm >> The Blue Honda and Black Toyota parked at the corner.
- Police: 12/12/2012 | 02:11 pm >> One or more arrests have been made in connection with the reported incident; with your assistance we will continue to closely monitor the situation.

Comment Posted

[ COMMENT ]

FIG. 11

Community User, Police or Security Personnel Login Page:

FIG. 13

Monitoring Incident Report

| You are logged in as copuser1 | logout | Home | Alerts | Blogs | Reports | Contact Us |

No Video

Reported Incidents

| 11/17/2011 | 09:38 pm | Police Alert – Robbery Pattern |
| 11/17/2011 | 09:36 pm | Police Alert – Robbery Pattern |
| 11/17/2011 | 09:14 pm | Police Alert – Car Thefts |
| 11/17/2011 | 09:00 pm | Police Alert – Burglary |
| 11/17/2011 | 07:51 pm | Police Alert – Car Breaks |
| 11/17/2011 | 02:46 pm | Police Alert – Car Thefts |
| 11/17/2011 | 02:44 pm | Possible Robbery |
| 11/17/2011 | 02:41 pm | Disorderly |
| 11/17/2011 | 10:31 am | Person Shot |
| 11/17/2011 | 09:29 am | Police Alert - Burglary |
| 11/17/2011 | 09:08 am | Suspicious Person |
| 11/17/2011 | 09:29 am | Crime in process |
| 11/17/2011 | 09:08 am | Some suspicious guys trying to |

Incident Title
Police Alert – Robbery Pattern

Incident Detail
Police Alert Detail: There has been a rash of robberies in the neighborhood recently. Suspects are targeting people walking alone late at night. We believe there are at least two suspects – one is described as short heavy set male with a beard. The other ...

Posted by *user2*

Comments

● Police: 11/17/2011 | 10:16 pm >> Thank you for reporting this incident. We are currently looking into this matter.

| You are logged in as copuser1 | logout | | Home | Alerts | Blogs | Reports | Contact Us |

No Video

Reported Incidents

| Date | Time | Link |
|---|---|---|
| 11/18/2011 | 12:55 am | Car Robbery |
| 11/18/2011 | 12:40 am | A man is being beaten by rowdies |
| 11/17/2011 | 11:32 pm | Police Alert – Some burglars are active in your area |
| 11/17/2011 | 09:38 pm | Police Alert – Robbery Patterns |
| 11/17/2011 | 09:36 pm | Police Alert – Robbery Patterns |
| 11/17/2011 | 09:14 pm | Police Alert – Car Thefts |
| 11/17/2011 | 09:00 pm | Police Alert - Burglary |
| 11/17/2011 | 07:51 pm | Police Alert – Car Breaks |
| 11/17/2011 | 02:46 pm | Police Alert – Car Thefts |
| 11/17/2011 | 02:44 pm | Poss Robbery |
| 11/17/2011 | 02:41 pm | Disorderly |
| 11/17/2011 | 10:31 am | Person Shot |
| 11/17/2011 | 09:29 am | Police Alert - Burglary |
| 11/17/2011 | 09:08 am | Suspicious Person |
| 11/17/2011 | 02:45 am | Crime in process |
| 11/17/2011 | 01:30 am | Some suspicious guys trying to come inside from house's back window |
| 11/17/2011 | 01:24 am | Some suspicious guys trying to come inside from house's back window |

Incident Title
Police Alert – Some burglars are active in your area

Incident Detail
Police Alert Detail: < Attention please, there are some burglars found in your area, so all residents of this area are requested to be careful and monitor every activity going around. If something is found suspicious, please inform us. Thank you. >

Posted by *user2*

Comments
- Police: 11/17/2011 | 11:42 pm >> Thank you for reporting this incident. We are currently looking into this matter.
- User: 11/17/2011 | 11:47 pm >> Need update regarding this case.

[                    ]

RESPOND

[ Select ▼ ]

ADD POLICE ALERT
Title

FIG. 17

Closing Incident Report/Police Alert

No Video

Reported Incidents

| | | |
|---|---|---|
| 11/17/2011 | 09:38 pm | Police Alert – Robbery Patterns |
| 11/17/2011 | 09:36 pm | Police Alert – Robbery Patterns |
| 11/17/2011 | 09:14 pm | Police Alert – Car Thefts |
| 11/17/2011 | 09:00 pm | Police Alert - Burglary |
| 11/17/2011 | 07:51 pm | Police Alert – Car Breaks |
| 11/17/2011 | 02:46 pm | Police Alert – Car Thefts |
| 11/17/2011 | 02:44 pm | Poss Robbery |
| 11/17/2011 | 02:41 pm | Disorderly |
| 11/17/2011 | 10:31 am | Person Shot |
| 11/17/2011 | 09:29 am | Police Alert - Burglary |
| 11/17/2011 | 09:08 am | Suspicious Person |
| 11/17/2011 | 02:45 am | Crime in process |
| 11/17/2011 | 01:30 am | Some suspicious guys trying to come inside from house's back window |
| 11/17/2011 | 01:24 am | Some suspicious guys trying to come inside from house's back window |
| 11/16/2011 | 06:30 pm | Police Alert – Car breaks |
| 11/14/2011 | 05:36 pm | <Burglary Spree> |
| 11/11/2011 | 09:36 am | Fight |
| 11/11/2011 | 09:33 am | <Robbery Pattern> < There has |

Incident Title
Police Alert – Robbery Pattern: Some burglars are active in your area

Incident Detail
Police Alert Detail: < There has been a rash of robberies in the neighborhood recently. Suspects are targeting people walking alone late at night. We believe there are at least two suspects – one is described as short heavy set male with a beard. The other ... >

Posted by *user2*

Comments

● Police: 11/17/2011 | 10:16 pm >> Thank you for reporting this incident. We are currently looking into this matter.

Suspects have been arrested.

RESPOND

Arrest ▽

ADD POLICE ALERT
Title

FIG. 18

Alert/Incident Concluding Message

| Date/Time | Title |
|---|---|
| 11/17/2011 | 09:38 pm | Police Alert – Robbery Patterns |
| 11/17/2011 | 09:36 pm | Police Alert – Robbery Patterns |
| 11/17/2011 | 09:14 pm | Police Alert – Car Thefts |
| 11/17/2011 | 09:00 pm | Police Alert - Burglary |
| 11/17/2011 | 07:51 pm | Police Alert – Car Breaks |
| 11/17/2011 | 02:46 pm | Police Alert – Car Thefts |
| 11/17/2011 | 02:44 pm | Poss Robbery |
| 11/17/2011 | 02:41 pm | Disorderly |
| 11/17/2011 | 10:31 am | Person Shot |
| 11/17/2011 | 09:29 am | Police Alert - Burglary |
| 11/17/2011 | 09:08 am | Suspicious Person |
| 11/17/2011 | 02:45 am | Crime in process |
| 11/17/2011 | 01:30 am | Some suspicious guys trying to come inside from house's back window |
| 11/17/2011 | 01:24 am | Some suspicious guys trying to come inside from house's back window |
| 11/16/2011 | 06:30 pm | Police Alert – Car breaks |
| 11/14/2011 | 05:36 pm | <Burglary Spree> |
| 11/11/2011 | 09:36 am | Fight |
| 11/11/2011 | 09:33 am | <Robbery Pattern> < There has been a rash of robberies in the neighborhood recently. Suspects are targeting people walking alone late at night. We believe there are at least two |

The other is over six feet. They often wear dark clothing. These suspects are armed with a gun. Please use caution walking late at night and promptly report suspicious activity.

Incident Detail

I saw two individuals that fit the description. They are standing near the parking garage.

Posted by *user1*

Comments

● Police :: 11/12/2011 | 01:21pm >> Testing
● User :: 11/12/2011 | 01:23pm >> Thank you
● Police :: 11/18/2011 | 04:19am >> Suspects have been arrested
● Police :: 11/18/2011 | 04:19am >> One or more arrests have been made in connection with the reported incident; with your assistance, we will continue to closely monitor the situation.

ADD POLICE ALERT

Title
[                    ]

Alert
[                    ]

☐ Check All
☐ Zone 1
☐ Zone 2
☐ Zone 3

SEND

Police or Security Personnel Report

| You are logged in as copuser1 | logout | Home | Alerts | Blogs | Reports | Contact Us |

Week ▾  View Report

New Incident Has Been Logged,
Click on Home Page ( OK )

iCan Activity

| Type | Number |
|---|---|
| iCan Reported Incidents | 20 |
| iCan Reported Incidents acknowledged by the Police | 17 |
| Average iCan Incident Police Response (minutes) | 37 |
| iCan alerts acknowledged within One minute | 7 |
| iCan alerts acknowledged between two and five minutes | 5 |
| iCan alerts acknowledged after five minutes | 28 | iCan Alert Categories

| iCan Incident Category | Number |
|---|---|
| Suspicious activity | 11 |
| Crime in Progress | 8 |
| Quality of Life | 1 |
| Person in need of assistance | 0 |
| Others | 0 |

FIG. 19

Add Police Alert

| | | | |
|---|---|---|---|
| 11/16/2011 | 06:30 pm | Police Alert – Car breaks | Arrest |
| 11/14/2011 | 05:36 pm | <Burglary Spree> | Add Police Alert |
| 11/11/2011 | 09:36 am | Fight | Title<br>Some burglars are active in your area |
| 11/11/2011 | 09:33 am | <Robbery Pattern> < There has been a rash of robberies in the neighborhood recently. Suspects are targeting people walking alone late at night. We believe there are at least two suspects – one is described as short heavy set male with a beard. The other is over six feet. They often wear dark clothing. These suspects are armed with a gun. Please use caution walking late at night and promptly report suspicious activity.> | Alert<br>Attention please, there are some burglars found in your area, so all residents of this area are ...<br>☑ Check All<br>☑ Zone 1<br>☑ Zone 2<br>☑ Zone 3<br>SEND<br>Add Violations<br>Enter Username: |

FIG. 20

Add Violation

| Reported Incidents | | |
|---|---|---|
| 11/17/2011 | 09:38 pm | Police Alert – Robbery Patterns |
| 11/17/2011 | 09:36 pm | Police Alert – Robbery Patterns |
| 11/17/2011 | 09:14 pm | Police Alert – Car Thefts |
| 11/17/2011 | 09:00 pm | Police Alert - Burglary |
| 11/17/2011 | 07:51 pm | Police Alert – Car Breaks |
| 11/17/2011 | 02:46 pm | Police Alert – Car Thefts |
| 11/17/2011 | 02:44 pm | Poss Robbery |
| 11/17/2011 | 02:41 pm | Disorderly |
| 11/17/2011 | 10:31 am | Person Shot |
| 11/17/2011 | 09:29 am | Police Alert - Burglary |
| 11/17/2011 | 09:08 am | Suspicious Person |
| 11/17/2011 | 02:45 am | Crime in process |
| 11/17/2011 | 01:30 am | Some suspicious guys trying to come inside from house's back window |
| 11/17/2011 | 01:24 am | Some suspicious guys trying to come inside from house's back window |
| 11/16/2011 | 06:30 pm | Police Alert – Car breaks |
| 11/14/2011 | 05:36 pm | <Burglary Spree> |
| 11/11/2011 | 09:36 am | Fight |
| 11/11/2011 | 09:33 am | <Robbery Pattern> < There has |

ADD POLICE ALERT

Title

Alert

☐ Check All
☐ Zone 1
☐ Zone 2
☐ Zone 3

SEND

Add Violations

Enter Username: user1

SEND

Monitor and Respond to Community Blogs

FIG. 21

| Date | Time | Subject | | |
|---|---|---|---|---|
| 11/17/2011 | 09:36 pm | Police Alert – Robbery Patterns | Title | |
| 11/17/2011 | 09:14 pm | Police Alert – Car Thefts | | |
| 11/17/2011 | 09:00 pm | Police Alert - Burglary | Alert | |
| 11/17/2011 | 07:51 pm | Police Alert – Car Breaks | | |
| 11/17/2011 | 02:46 pm | Police Alert – Car Thefts | | |
| 11/17/2011 | 02:44 pm | Poss Robbery | | |
| 11/17/2011 | 02:41 pm | Disorderly | ☐ Check All | |
| 11/17/2011 | 10:31 am | Person Shot | ☐ Zone 1 | |
| 11/17/2011 | 09:29 am | Police Alert - Burglary | ☐ Zone 2 | |
| 11/17/2011 | 09:08 am | Suspicious Person | ☐ Zone 3 | |
| 11/17/2011 | 02:45 am | Crime in process | SEND | |
| 11/17/2011 | 01:30 am | Some suspicious guys trying to come inside from house's back window | Add Violations | |
| 11/17/2011 | 01:24 am | Some suspicious guys trying to come inside from house's back window | Enter Username: | |
| 11/16/2011 | 06:30 pm | Police Alert – Car breaks | SEND | |
| 11/14/2011 | 05:36 pm | <Burglary Spree> | | |
| 11/11/2011 | 09:36 am | Fight | Monitor and Respond to Community Blogs | |
| 11/11/2011 | 09:33 am | <Robbery Pattern> < There has been a rash of robberies in the neighborhood recently. Suspects are targeting people walking alone late at night. We | | |

FIG. 22

Police or Security Personnel Alerts

FIG. 25

Detailed View of Blog

| You are logged in as copuser1 | logout | Home | Alerts | Blogs | Reports | Contact Us |

Recent Blogs

Keep your house safe    (1 replies)
Hello World    (6 replies)

Blog Details

Title
Keep you house safe

Delete Blog

Post
You're on the run, and you need a place to hide. Maybe you are a professional spy setting up a dangerous operation in a foreign city, and you are looking for a place to blend in. Or possibly you are an outspoken critic of a repressive government and on the run from your assassins. Or you could just be a criminal who made a daring escape from prison, and a place to sleep for a night is all you need before you keep running from the law. Either way, what you are looking for is a simple, but secure, location where no one will find you or become aware of your activities – what you need is a safe house. When a person places himself in an extraordinary situation, staying hidden and blending in with the neighbors may be the safest option. Safe houses have been around ever since humans have built shelters.

Comments
● user2: 2011-11-17 01:43:15: Good stuff ...

Enter Comment: [          ]

COMMENT

Enter Username: [          ]

SEND

Delete Blog

Add Violation in Blog

| You are logged in as copuser1 | logout | Home | Alerts | Blogs | Reports | Contact Us |

Recent Blogs

Keep your house safe (2 replies)

Hello World (6 replies)

Blog Details

Title
Keep you house safe

Delete Blog

Post
You're on the run, and you need a place to hide. Maybe you are a professional spy setting up a dangerous operation in a foreign city, and you are looking for a place to blend in. Or possibly you are an outspoken critic of a repressive government and on the run from your assassins. Or you could just be a criminal who made a daring escape from prison, and a place to sleep for a night is all you need before you keep running from the law. Either way, what you are looking for is a simple, but secure, location where no one will find you or become aware of your activities – what you need is a safe house. When a person places himself in an extraordinary situation, staying hidden and blending in with the neighbors may be the safest option. Safe houses have been around ever since humans have built shelters.

Comments
● user2: 2011-11-17 01:43:15: Good stuff ...
● copuser1: 2011-11-18 00:08:29: Good one.

Enter Comment: [       ]

COMMENT

Enter Username: [user1]

SEND

FIG. 27

Police or Security Personnel Reports iCan Activity

| Type | Number |
|---|---|
| iCan Reported Incidents | 19 |
| iCan Reported Incidents acknowledged by the Police | 16 |
| Average iCan Incident Police Response (minutes) | 38 |
| iCan alerts acknowledged within One minute | 7 |
| iCan alerts acknowledged between two and five minutes | 5 |
| iCan alerts acknowledged after five minutes | 28 | iCan Alert Categories

| iCan Incident Category | Number |
|---|---|
| Suspicious activity | 11 |
| Crime in Progress | 7 |
| Quality of Life | 1 |
| Person in need of assistance | 0 |
| Others | 0 | iCan Alert Disposition

| Police Action Taken | Number |
|---|---|
| Arrest | 3 |
| Summons issued | 1 |
| Field Interview Report | 1 |
| Incident Report | 0 |

FIG. 28 iCan Report Month Wise

| You are logged in as copuser1 | logout | Home | Alerts | Blogs | Reports | Contact Us |

[Week ▼]  (View Report)
Week
Month iCan Activity

| Type | Number |
|---|---|
| iCan Reported Incidents | 21 |
| iCan Reported Incidents acknowledged by the Police | 17 |
| Average iCan Incident Police Response (minutes) | 37 |
| iCan alerts acknowledged within One minute | 7 |
| iCan alerts acknowledged between two and five minutes | 5 |
| iCan alerts acknowledged after five minutes | 28 | iCan Alert Categories

| iCan Incident Category | Number |
|---|---|
| Suspicious activity | 12 |
| Crime in Progress | 8 |
| Quality of Life | 1 |
| Person in need of assistance | 0 |
| Others | 0 |

FIG. 29

Forgotten Password

Username user1

Security Questions

What is your pet dog's name?
Your Birth Place?
Mother's Maiden Name?

SUBMIT

You are logged in as user2 | logout    Home | Report Incident | Alerts | Blogs | Reports | Helpful Links | Contact Us iCan Violations Count :: 0
Incident Detail
Crime in process
4-6 guys beating a kid

Reported Incidents

| 11/17/2011 | 02:45 am | Crime in process |
| 11/17/2011 | 01:30 am | Some suspicious guys trying to come inside from house's back window |
| 11/17/2011 | 01:24 am | Some suspicious guys trying to come inside from house's back window |

● Police: 11/17/2011 | 02:46 am >> Thank you for reporting this incident. We are currently looking into this matter.
● User: 11/17/2011 | 02:47 am >> OK
● Police: 11/17/2011 | 02:53 am >> Can you give us a little description of those guys' appearance?

[They have run away now]

COMMENT

⚠ Recent Police Alerts

11/16/2011 | 06:28 pm  Car Breaks
Several car breaks have been reported in your area. Suspects are targeting parked cars with packages left unattended in unlit areas.
RESPOND

11/14/2011 | 05:33 pm  Burglary Spree
We like to make you aware of several burglaries reported in your neighborhood. These burglaries have occurred during weekdays between 12:00PM and 3:00PM. The suspects are stealing mostly electronic devices and have gained entry through unlocked windows. Please secure all windows and promptly report suspicious activity.
RESPOND

11/11/2011 | 09:31 am  Robbery Pattern
There has been a rash of robberies in the neighborhood recently. Suspects are targeting people walking alone at night. We believe there are at least two suspects - one is described as a short heavy set make with beard. The other is over six feet. The often wear dark clothing. These suspects are armed with a gun. Please use caution walking late at night and promptly report suspicious activity.
RESPOND

Recent Blogs
Keep your house safe                    (1 replies)
Hello World                             (4 replies)
Helpful Links

FIG. 37

You are logged in as user2 | logout    Home | Report Incident | Alerts | Blogs | Reports | Helpful Links | Contact Us ⚠ Recent Police Alerts

11/16/2011 | 06:28 pm    Car Breaks
Several car breaks have been reported in your area. Suspects are targeting parked cars with packages left unattended in unlit areas.
RESPOND

11/14/2011 | 05:33 pm    Burglary Spree
We like to make you aware of several burglaries reported in your neighborhood. These burglaries have occurred during weekdays between 12:00PM and 3:00PM. The suspects are stealing mostly electronic devices and have gained entry through read unlocked windows. Please secure all windows and promptly report suspicious activity.
RESPOND

11/11/2011 | 09:31 am    Robbery Pattern
There has been a rash of robberies in the neighborhood recently. Suspects are targeting people walking alone at night.. We believe there are at least two suspects - one is described as a short heavy set make with beard. The other is over six feet. The often wear dark clothing. These suspects are armed with a gun. Please use caution walking late at night and promptly report suspicious activity.
RESPOND

Reporting Page (Resident):

```
You are logged in as user2 | logout    Home | Report Incident | Alerts | Blogs | Reports | Helpful Links | Contact Us Recent Blogs                    Blog Details Hello World      (3 replies)    Title
                                   Hello World Post
                                   Blog 1

Comment
                                   ● user1: 2011-11-16 21:55:31: wfsadfsad
                                   ● user1: 2011-11-16 21:55:40: user 2 2nd comment
                                   ● user2: 2011-11-17 01:35:44: Hello World!

┌─────────────────────────────────┐
                                   │ how are you ...                 │
                                   │                                 │
                                   └─────────────────────────────────┘
                                   Comment posted successfully
                                     SEND                Add New Blog
```

| You are logged in as user2 | logout | Home | Report Incident | Alerts | Blogs | Reports | Helpful Links | Contact Us |

Recent Blogs

Hello World          (4 replies)

Blog Details

Title
Hello World

Post
Blog 1

Comment
- user1:  2011-11-16 21:55:31:  wfsadfsad
- user1:  2011-11-16 21:55:40:  user 2 2nd comment
- user2:  2011-11-17 01:35:44:  Hello World!
- user2:  2011-11-17 01:36:18:  how are you ...

Comment posted successfully

SEND

Add New Blog

Title
Keep your house safe

Post
You're on the run, and you need a place to hide. Maybe you are a professional spy setting up a dangerous operation in a foreign city, and you are

SEND

Reporting Page (Resident):

| iCan Activity | |
|---|---|
| Type | Number |
| iCan Reported Incidents | 6 |
| iCan Reported Incidents acknowledged by the Police | 3 |
| iCan alerts acknowledged within One minute | 0 |
| Average iCan Incident Police Response (minutes) | 1 |
| iCan alerts acknowledged between two and five minutes | 0 |
| iCan alerts acknowledged after five minutes | 4 |
| iCan Alert Categories | |
| iCan Incident Category | Number |
| Suspicious activity | 5 |
| Crime in Progress | 1 |

FIG. 41

Helpful Links (Resident):

Here, user can find some link which may prove to be helpful to him.

Contact Us (Resident):

METHOD AND SYSTEM FOR AN INTERACTIVE COMMUNITY ALERT NETWORK

CROSS-REFERENCE TO RELATED APPLICATIONS/INCORPORATION BY REFERENCE

This patent application makes reference to, claims priority to and claims benefit from U.S. Provisional Application Ser. No. 61/578,063, which was filed on Dec. 20, 2011.

This application also make reference to:
U.S. application Ser. No. 13/107,260 filed on May 13, 2011; and
U.S. application Ser. No. 13/050,311 filed on Mar. 17, 2011.

Each of the above referenced application is hereby incorporated herein by reference in its entirety.

FIELD OF TECHNOLOGY

Certain embodiments of the disclosure relate to interactive systems. More specifically, certain embodiments of the disclosure relate to a method and system for an interactive community alert network.

BACKGROUND OF THE DISCLOSURE

Current systems are limited in their ability to enable community participation in incident reporting and collaboration with first responders (e.g., police, security personnel). Enhancing such participation can positively impact the interaction between different stakeholders in the community.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for an interactive community alert network, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 7 is a diagram that illustrates an example of an interactive community alert network blog page, in accordance with an embodiment of the disclosure.

FIG. 8 is a diagram that illustrates an example of an interactive community alert network activity report page, in accordance with an embodiment of the disclosure.

FIG. 10 is a diagram that illustrates an example of an interactive community alert network resident or user reporting page, in accordance with an embodiment of the disclosure.

FIG. 11 is a diagram that illustrates an example of an interactive community alert network resident incident monitoring page, in accordance with an embodiment of the disclosure.

FIG. 13 is a diagram that illustrates an example of an interactive community alert network police or security personnel home page, in accordance with an embodiment of the disclosure.

FIG. 14 is a diagram that illustrates an example of an interactive community alert network monitoring incident report page, in accordance with an embodiment of the disclosure.

FIG. 15 is a diagram that illustrates an example of an interactive community alert network incident report view and response page, in accordance with an embodiment of the disclosure.

FIG. 17 is a diagram that illustrates an example of an interactive community alert network incident report closing page, in accordance with an embodiment of the disclosure.

FIG. 18 is a diagram that illustrates an example of an interactive community alert network incident report closing page, in accordance with an embodiment of the disclosure.

FIG. 18 is a diagram that illustrates an example of an interactive community alert network alert/incident close message page, in accordance with an embodiment of the disclosure.

FIG. 19 is a diagram that illustrates an example of an interactive community alert network police or security personnel report page, in accordance with an embodiment of the disclosure.

FIG. 20 is a diagram that illustrates an example of an interactive community alert network add police alert page, in accordance with an embodiment of the disclosure.

FIG. 21 is a diagram that illustrates an example of an interactive community alert network add violation page, in accordance with an embodiment of the disclosure.

FIG. 22 is a diagram that illustrates an example of an interactive community alert network add violation and blog page, in accordance with an embodiment of the disclosure.

FIG. 25 is a diagram that illustrates an example of a detailed view of an interactive community alert network police or security personnel blogs page, in accordance with an embodiment of the disclosure.

FIG. 27 is a diagram that illustrates an example of an interactive community alert network add violation blog page, in accordance with an embodiment of the disclosure.

FIG. 28 is a diagram that illustrates an example of an interactive community alert network police or security personnel report page, in accordance with an embodiment of the disclosure.

FIG. 29 is a diagram that illustrates an example of an interactive community alert network report month-wise page, in accordance with an embodiment of the disclosure.

FIG. 31 is a diagram that illustrates an example of an interactive community alert network forgotten password page, in accordance with an embodiment of the disclosure.

FIG. 36 is a diagram that illustrates an example of an interactive community alert network resident discussion page, in accordance with an embodiment of the disclosure.

FIG. 37 is a diagram that illustrates an example of an interactive community alert network resident alerts page, in accordance with an embodiment of the disclosure.

FIG. 38 is a diagram that illustrates an example of an interactive community alert network resident reporting page, in accordance with an embodiment of the disclosure.

FIG. 40 is a diagram that illustrates an example of an interactive community alert network resident blog creation page, in accordance with an embodiment of the disclosure.

FIG. 41 is a diagram that illustrates an example of an interactive community alert network resident reporting page showing report activities, in accordance with an embodiment of the disclosure.

DETAILED DESCRIPTION OF THE DISCLOSURE

Figure 1:
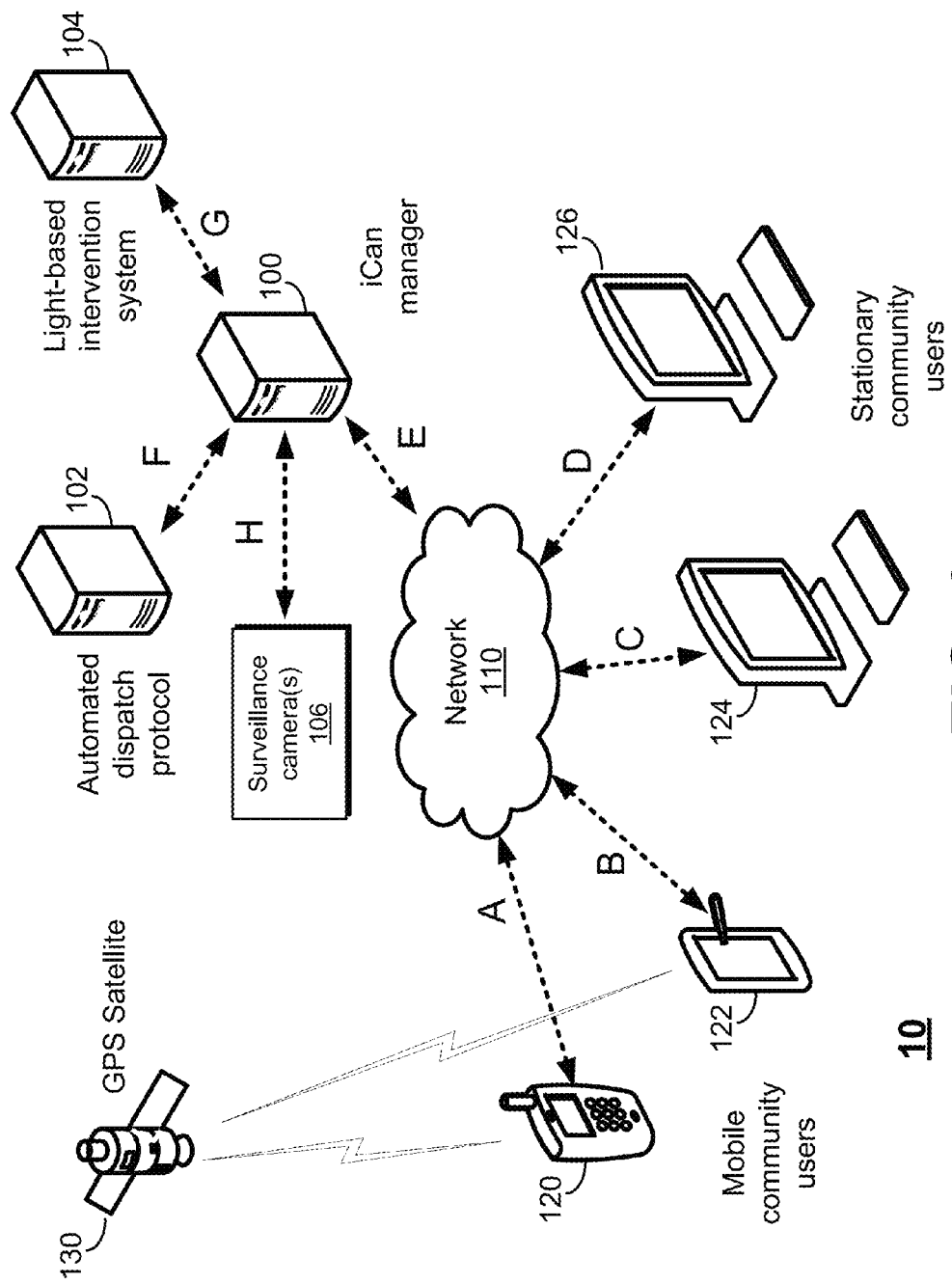
FIG. 1 is a diagram that illustrates an example of an interactive community alert network system with multiple community users, in accordance with an embodiment of the disclosure.

Certain embodiments of the disclosure may be found in a method and system for an interactive community alert network system. In various embodiments of the disclosure, an interactive community alert network (iCan) system is operable to receive one or more signals indicating a report of an incident. The iCan system may determine a location of the reported incident. One or more visual and/or audio capture devices such as the surveillance cameras, which may be within proximity of the determined location of the reported incident may be adjusted. Corresponding visual and/or audio content of the reported incident may be captured from the one or more adjusted visual and/or audio capture devices such as the surveillance cameras. The captured corresponding visual and/or audio content of the reported incident may be utilized to determine how to handle the reported incident.

The location of the reported incident may be determined based on a position of a device that may be utilized to report the incident and/or localization through the use of one or more electronic mapping systems or panoramic still images of CCTV camera views. In this regard, the location of the incident may be determined based on a global navigation satellite system position of the device utilized to report the incident and/or based on information that may be within the report of the incident may also be utilized to determine the location of the incident. The iCan system may be operable to determine whether the report of the incident specifies that there is a crime in progress or other incident requiring police intervention. The iCan system may also be operable to dispatch a policing authority to the determined location of the reported incident if the report of the incident specifies that there may be a crime in progress. The iCan system may also notify a reporter of the incident to call an emergency number such as 911 to report the crime in progress.

The iCan system 10 may be operable to collect Incident statistics and update one or more incident statistical parameters based on the reported incident. One or more reports may be generated based on the incident statistical parameters. The reports may be generated based on time and/or location. Community members may view these reports. The iCan system may be operable to generate, on a graphical user interface (GUI), a map of the determined location of the reported incident. At least a portion of the corresponding visual and/or audio content of the reported incident may be displayed on the graphical user interface. A reporter of an incident may receive an acknowledgement of the report of the incident from a policing authority that handles the report of said incident. The acknowledgement may be communicated to the reporter of the incident via the iCan system.

In accordance with an embodiment of the disclosure, the received one or more signals that indicates a report of an incident may be communicated from an app running on, for example, a mobile community user device, which may comprise a smartphone. In this regard, the location of the reported incident may be determined based on information communicated by the app on the smartphone. The app running on the smartphone may comprise a panic mode of operation and a message mode of operation. If the smartphone is outside an operating range of the interactive community alert network system 10, which may be referred to as a home interactive community alert network system, the app running on the smartphone may be operable to communicate with one or more other interactive community alert network systems. The app may communicate through those one or more other interactive community alert network systems in order to reach and communicate with the home interactive community alert network system 10.

FIG. 1 is a diagram that illustrates an example of an interactive community alert network system with multiple community users, in accordance with an embodiment of the disclosure. Referring to FIG. 1, there is shown an interactive Community Alert Network (iCan) system 10 that comprises an iCan manager 100, an automated dispatch protocol unit 102, a light-based intervention system 104, surveillance cameras 106, a network 110, a GPS satellite 130. Also shown in FIG. 1 are a plurality of communication links, namely, communication links A, B, C, D and E. FIG. 1 also shows a plurality of community user devices 120, 122, 124 and 126.

The iCan manager 100 may comprise suitable logic, circuitry, interfaces and/or code that may be operable to connect to multiple community users via a network 110 and a communication link E. In one embodiment of the disclosure, the communication link E may comprise a broadband communication link. The communication link E may comprise a wired and/or a wireless communication link.

The iCan manager 100 may also be operable to connect to an automated dispatch protocol unit 102 via a communication link F, to a light-based intervention system 104 via a communication link G, and/or to one or more surveillance cameras 106 via a communication link H.

The automated dispatch protocol unit 102 may comprise suitable logic circuitry interfaces and/or code that may be operable to provide an automated dispatch protocol. The automated dispatch protocol unit 102 may be operable to generate display information for multiple dispatch schemes that correspond to different types of emergency responses. Once a dispatch scheme is selected, a computer-aided dispatcher (CAD) may be operable to generate corresponding electronic broadcast instructions that may be communicated to one or more emergency responders. The U.S. application Ser. No. 13/107,260 filed on May 13, 2011, discloses a method and system for an automated dispatch protocol, and is hereby incorporated herein by reference in its entirety.

The light-based intervention system 104 may comprise suitable logic circuitry interfaces and/or code that may be operable to control one or more illumination sources and may received information for a target location via one or more network connections or links. The information may be based on information that may be captured by, for example, one or more of the surveillance cameras 106. The light-based intervention system 104 may be operable to utilize the received information to adjust at least a portion of the one or more illumination sources. The U.S. application Ser. No. 13/050, 311 filed on Mar. 17, 2011, discloses a method and system for light-based intervention, and is hereby incorporated herein by reference in its entirety.

The surveillance cameras 106 may comprise suitable logic circuitry interfaces and/or code that may be operable to capture video and/or still images within the community that is serviced by the interactive Community Alert Network system 10. The surveillance cameras 106 can comprise analog surveillance cameras and/or Internet Protocol (IP)-based surveillance cameras. The surveillance cameras 106 may comprise a plurality of networked CCTV cameras and/or digital cameras that may be controlled remotely. The feeds from the surveillance cameras 106 may be stored in a storage device, which may enable real-time, near real-time and subsequent playback. The surveillance cameras 106 may also comprise microphones that may be utilized to collect live audio that corresponds to the video feeds that are captured.

The network 110 may comprise suitable logic circuitry interfaces and/or code that may be operable to provide wired and/or wireless communication between various entities within the interactive Community Alert Network system 10. The network 110 enables communication between the automated dispatch protocol 102, the light-based intervention system 104, and/or the surveillance cameras 106.

The GPS satellite system 130 may comprise suitable logic circuitry interfaces and/or code that may be operable to transmit GPS signals, which may be utilized to determine the position of a device that comprises a corresponding GPS receiver that is operable to receive the GPS signals. Location information regarding the community users may be provided to the iCan manager 100 for operations. In this regard, location information may comprise Internet Protocol (IP) addresses and/or position fixes associated with Global Positioning System (GPS) 130 or other similar navigation systems. For example, the location of the mobile community user devices 120 and 122 may be determined by their respective devices from satellite signals that may be received from one or more navigation satellites within the GPS satellite system 130. It should be recognized that although a single GPS satellite is shown representing the GPS satellite system 130, the GPS satellite 130 comprises a plurality of satellites that transmit signals which are received and utilized to determine location. Additionally, it should be recognized that although a GPS satellite system is shown, the disclosure is not limited in this regard. Accordingly, any global navigation satellite system (GNSS) such as Glonass and Galileo may be utilized without departing from the spirit and scope of the disclosure.

The community user devices may comprise mobile community user devices 120 and 122, for example, which may be operable to connect to the network 110 via the communication links A and B, respectively. The community user devices may also comprise stationary community user devices 124 and 126, for example, which can connect to the network 110 via communication links C and D, respectively. The community user devices 120, 122, 124, 126 may comprise communication devices with wired and/or wireless capability that may be utilized by members of a community to access and communicate with the interactive community alert network system. The community user devices 120, 122, 124, 126 may be located in a community, which may comprise one or more of a neighborhood, a campus, a portion of a town or city, a venue, a manufacturing or processing facility, or other like community, for example. In some instance, the mobile community user devices 120 and 122 may be operable to communicate with the interactive community alert network system when they are not located within a neighborhood or service area that provides direct service to their corresponding user device.

The mobile community user devices 120 and 122 may comprise suitable logic, circuitry, interfaces and/or code that may be operable to provide communication. The mobile community user devices 120 and 122 may comprise a cellular telephone, a smartphone, and a tablet, for example. In some embodiments of the disclosure, the mobile community user devices 120 and 122 may comprise an application, which may be referred as an app, running on the operating system of the mobile community user devices 120 and 122. It should be recognized that although an app running on the operating system is disclosed, the disclosure is not limited in this regard. Accordingly, the features provided by the app may be integrated within the operating system or otherwise be a part of the code utilized for operation by the mobile community user devices 120 and 122.

The stationary community user devices 124 and 126 may comprise suitable logic, circuitry, interfaces and/or code that may be operable to provide communication. The stationary community user devices 124 and 126 may comprise a personal computer and a laptop, which may be operable to communicate via one or more wired and/or wireless technologies.

The various communication links, namely A, B, C, D and E, and/or the network 110 may comprise wireless and/or wireline portions. For example, the communication links, namely A and B, to the network 110 for the mobile community user devices 120, 122, respectively, may comprise wireless links while the communication links, namely C and D, to the network 110 for stationary community users 124, 126 may comprise wireline links.

An iCan system, such as the iCan system 10 that comprises the iCan manager 100 described above with respect to FIG. 1, may be operable to combine web-based technology with public surveillance closed-circuit television (CCTV) cameras (e.g., surveillance cameras 106) to produce an interactive virtual public safety incident reporting and community collaboration tool. With the use of simple input operations, such as key strokes, the point and click of a computer mouse, or a touch screen, iCan users can instantly and/or anonymously alert the police or other security personnel (e.g., private security personnel) of suspected criminal activities, or other suspicious activities, occurring locally. In this way, the neighborhood public surveillance cameras 106 and/or other surveillance technologies may be oriented toward incident locations for viewing by police or security personnel.

In operation, citizens or residents of a community may use a combination of text messaging and neighborhood panoramic still photos or electronic maps to communicate with police or security personnel and pin point incident locations. When citizens observe a potential crime in progress, suspicious activity, or other matter of police interest, they log on to an iCan website provided by the iCan manager 100 and enter a brief text description of the event. The iCan website can be accessed by providing an address to a browser directly or by activating an application that opens up an iCan login webpage directly. iCan users can then be presented with, for example, panoramic still images and/or electronic maps of their neighborhood to use as reference for localizing and reporting the incident. Live feeds can be used but need not be provided. Using the mouse pointer or some other input technique (e.g., touch screen on the mobile community user devices 120 and 122), an iCan system reporter may scroll over the image and pinpoint and click on the precise location of the incident.

The police and/or other security personnel may be instantly alerted to the message of the person reporting the incident. The police and/or other security personnel may be prompted to view the event by permitting one or more corresponding surveillance cameras to turn toward and focus on the precise location of the incident that is indicated by the citizen.

The use of the iCan system 10 in community scenarios (e.g., neighborhoods, campuses, malls, companies, factories, sports venues) can successfully further community policing or security goals, which may enable law enforcement or security agencies to explore unique opportunities to strengthen police—community collaborative efforts, while also increasing the effectiveness and reach of limited resources.

Generalizing and prioritizing public safety concerns and policing services from a law enforcement perspective or at community or city wide levels only, may not always address the point that crime and perception of safety and security are subjective, localized, and quite often very personal. Furthermore, although residents of a community often share the same experiences and concerns, how they prioritize those concerns and gauge police or security responsiveness—how they form perceptions of safety and security—may vary.

Even under favorable circumstances, most law enforcement or security personnel or agencies simply cannot have patrol personnel on every corner or outside every neighbor's home to deal with the myriad of public safety matters deemed important by community members at all times, or even most of the time. The iCan system 10 enables police and/or other security personnel to identify and address community risk factors, crime, and perception of crime problems one neighborhood and one resident at a time. Moreover, while the iCan system 10 can be used over a wide region, it is also capable of supporting individual communities within that region. By providing residents with the ability to instantly and anonymously draw police or security attention to public safety matters they deem deserving of individualized attention, police or security forces can efficiently personalize the delivery of services, increase mutually satisfying interactions with the public, and incentivize public participation. Doing so ultimately leads to increased levels of community guardianship and lower levels of crime.

The iCan system 10 also provides further enhancement to community policing goals by providing citizens with on-demand access to the police, or to other security forces, strengthening community cohesion and collaborative problem solving, and promoting increasingly shared responsibility and accountability among all stakeholders for community safety.

The interactive community alert network system is an integrated policing system that is operable to take different types of information from a plurality of sources and synchronizes and blends the corresponding data. The resulting synchronized and blended data may be utilized to provide immediate visual and/or audio feedback from the scene of a reported incident.

Figure 2:
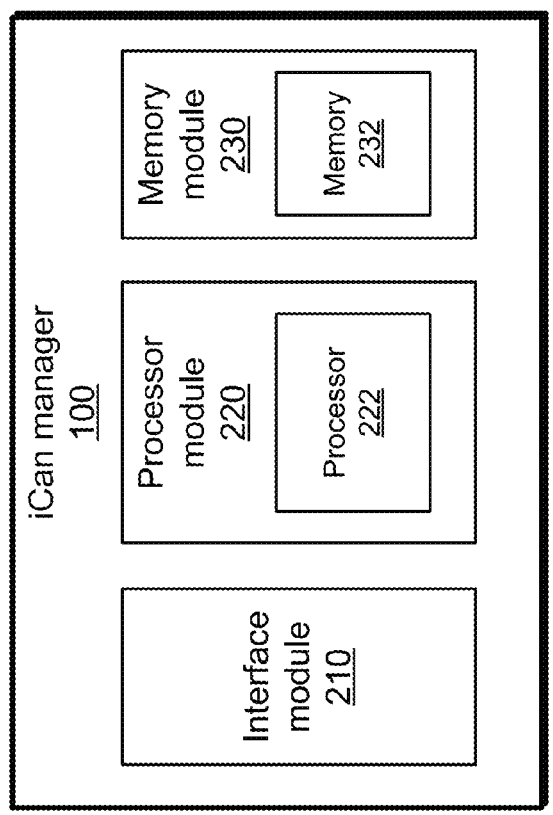
FIG. 2 is a diagram that illustrates an example of an interactive community alert network manager architecture, in accordance with an embodiment of the disclosure.

FIG. 2 is a diagram that illustrates an example of an interactive community alert network manager architecture, in accordance with an embodiment of the disclosure. Referring to FIG. 2, the iCan manager 100 can comprise an interface module 210, a processor module 220, and a memory module 230. The iCan manager 100 may operate as a web server for preparing, analyzing, and delivering information or other content used for interactive community participation, collaboration, and/or alerting.

The interface module 210 may comprise suitable logic, circuitry, code, and/or interfaces that are operable to enable communication with one or more community members or residents, utilizing the automated dispatch protocol handled by the automated dispatch protocol unit 102, with the light-based intervention system 104, and/or with the one or more surveillance cameras 106. The interface module 210 enables interaction with input/output devices (e.g., keyboards, touch screens, mouse or track balls, stylus, displays).

The processor module 220 may comprise suitable logic, circuitry, code, and/or interfaces that are operable to perform data processing to corresponding data received from community users and/or data received from security personnel. In some instances, the data processed by the processor module 220 may be received from other systems such as the automated dispatch protocol 102, the light-based intervention system 104, the one or more surveillance cameras 106, and/or the memory module 230. The processing may comprise the formatting, handling, generation, retrieval, and/or analysis of data. Moreover, the processing may comprise the preparation of data for storage and/or transmission. The processor module 220 may comprise one or more processors 222 to perform the data processing described above. The processor 222 may be a host processor or central processing unit (CPU), for example.

The processor module 220 may also be operable to capture and analyze statistics that may be associated with incident reports. For example, the processor module may be operable to analyze incident reports data and generate corresponding statistical data, which may be stored in the memory module 230. The generated statistical data may also be analyzed and utilized to determine various incident trends and to generate reports.

The memory module 230 may comprise suitable logic, circuitry, code, and/or interfaces that can be operable to store data. The memory module 230 may be implemented separate from the iCan manager 100 by direct connection to it or as part of a networked memory. The memory module 230 can comprise one or more distinct memories 232, each of which can be used to store different types of information. At least a portion of the memory module 230 may be implemented as a database.

In operation, iCan manager 100 enables the police and/or other security personnel to observe, in real-time, what citizens are reporting and determine if activities constitute criminal acts or situations requiring police intervention. The iCan manager 100 enables the police and/or other security personnel to communicate video feeds of the incident directly to police patrols in the area, giving them advance information and surveillance data as they respond to a reported incident. The iCan manager 100 enables the police and/or other security personnel police and citizens to interact through, for example, the iCan website to clarify incident details or gain additional information as necessary. At the conclusion of the event, the police can provide the reporting citizen with feedback and/or outcomes from their follow up activities for the corresponding reported incident. The iCan manager 100 may capture statistical data of interactions between the community and police, police responsiveness, results, and levels of community participation. The captured statistical data may be processed and analyzed by the processor module 220 and stored in the memory module 230. The iCan manager 100 may generate reports based on the statistical data that is collected. These reports can be provided to the community through the iCan website. The generated reports may comprise specific incident reports, trend reports and/or periodic reports.

The iCan system 10 is operable to enable and support a community blog, which offers a venue for residents to communicate with others about similar experiences and share views and ideas about how to coordinate neighborhood iCan watch schedules and community vigilance. This additional level of communication may be utilized to help break down neighborhood isolation and serve as a catalyst for widespread collaboration, new alliances and action plans for increasing or preserving community safety. The iCan community blog information may also help alert the police or other security personnel to emerging problems and improve responses to public safety matters of importance to local residents.

The iCan system 10 may also be operable to provide alerts to police and/or other policing authority. In this regard, the police and/or other policing authority may utilize the iCan Alert feature enabled and supported by the iCan system 10 to quickly educate and alert the community electronically about, for example, neighborhood crime trends, visible cues of crime problems, wanted criminals, and/or request assistance in solving and preventing crime.

The iCan system 10 may also be operable to provide a community activity report functionality. The community activity report, which may be enabled and supported by the iCan manager 100, is operable to provide both residents and police and/or other policing authority with insights into the type of neighborhood situations prompting iCan alerts and actions of the police force. The community activity report functionality is operable to display aperiodic or periodic data, for example, weekly or monthly iCan activity data, alerts by type, police response metrics, and/or final outcomes. This information may provide useful and transparent measures of community and police or security efforts to collectively improve safety and security.

The iCan system 10 may allow police and/or other policing authority to provide better problem solving at a fraction of the cost that would otherwise take one or more other systems to provide somewhat similar types of coverage. The iCan system 10 enhances the quality of problem solving efforts and speeds resolution of the incidents and/or reports, thereby reducing the cost of policing services and increasing public satisfaction. Users of the iCan system 10, for example residents and community members, shed invaluable light on the characteristics of neighborhood crime and quality-of-life conditions by providing the police with just-in-time alerts and views that they would otherwise have to waste precious resources trying to garner on their own. This allows the police and/or other policing authority, even in instances in which their resources are limited, to observe, evaluate, develop evidence of criminal activity, stop serious crime before it happens, and employ more informed and effective problem solving methods for a fraction of the time and cost required in the past.

The iCan system 10 may also be utilized to prevent crime and reduce the fear-of-crime. In this regard, the iCan system 10 may be utilized as a powerful crime prevention tool. Once it is known that local community residents or businesses can instantly and/or anonymously place the virtual eyes of the police on suspected criminal activity with just the click of a computer mouse, for example, would-be criminals become weary of committing crimes in those neighborhoods because they never know who is watching or from where.

The iCan system 10 may also be utilized to provide target hardening. In this regard, the iCan system 10 is operable to enable and support virtual connect and community alert features, which provide citizens with tools to help protect and target harden their communities against criminal activities or suspicious activities. The police, first responders, security personnel, or other emergency personnel or agencies can use iCan Connect and Community Alert features to provide residents with tips on how—and the means by which—to recognize and accurately report pre-incident indicators and suspicious activity in a timely fashion.

The iCan system 10 also provides a cost-effective force multiplier. In this regard, by connecting community-based vigilance with public surveillance CCTV monitoring systems (e.g., surveillance cameras 106) and the internet, the iCan system 10 is operable to help transform community watch programs and conventional CCTV monitoring methods into more effective, capable, and collaborative crime prevention tools that exponentially extend the reach of law enforcement agencies, without increasing cost.

The iCan system 10 is operable to enable and support features such as iCan Mobile Connect, iCan Community Connect, iCan Business Connect, iCan Business Alert, iCan Campus Mobile Connect, and iCan Campus Alert.

The iCan Mobile Connect feature of the iCan system 10 allows users with smartphones or other hand held communication devices, for example the mobile community user devices 120 and 122, to alert police of and orient police IP-based CCTV cameras (e.g., surveillance cameras 106) towards public safety concerns. iCan Mobile Connect embeds community CCTV camera coverage areas into a mobile community map application for use by citizens anywhere within iCan service areas. Pointing on a map provided to the user localizes the incident and produces a text screen for users to enter a brief description of their observations. The iCan Community Connect feature enables community members to help the police use community-wide public surveillance CCTV cameras with greater focus and precision.

With the iCan Mobile Connect, security ambassadors, employees, and other authorized personnel can use smart phones or other mobile devices to instantly alert CCTV monitoring centers and police or security forces to ongoing criminal events or suspicious activity requiring closer observation through remote monitoring.

The On-demand CCTV monitoring, security alert, and public safety collaboration capabilities provide an entirely new level of protection and multiplies the reach and effectiveness of business district security operations.

The iCan Community Connect feature of iCan system 10 allows for synchronous virtual community meetings between the beat cop or police department and community iCan user groups. It is not always possible for residents to physically attend community public safety meetings at a specific time or openly share matters of concern for fear of personal safety. The iCan Community Connect feature provides both iCan users and local police the advantage of traditional face-to-face community meetings while participants may actually be many miles apart. User anonymity offers iCan virtual meeting participants the opportunity to openly discuss and share concerns without compromising personal safety. The police and/or other policing authority may host scheduled virtual iCan community meetings and provide iCan users a time period to convey or exchange information or ask questions of the police via text messaging. During iCan Community Connect virtual meetings, the police can elicit community input, exchange ideas and report information that can strengthen partnerships and shape strategies to address local problems.

The iCan Business Connect feature of the iCan system 10 establishes a formal virtual communications network between business establishments, local CCTV monitoring centers, and security and police forces. With iCan Business Connect, business and commercial improvement districts, industrial parks, and other commercial estates located in private or public CCTV coverage areas can instantly alert security or police personnel to, and orient CCTV cameras toward, suspicious or abnormal activity in their immediate vicinity.

The use of the iCan Business Alert feature of the iCan system 10, police and security personnel can provide business members with timely information about crime trends to aid them in recognizing ongoing suspicious activities. Business establishments can easily and quickly exchange information about suspicious events and images of matters of safety and security.

The iCan Campus Mobile Connect feature of the iCan system 10 may be used in colleges, universities, or other institutions that use closed circuit television (CCTV) cameras to monitor and record campus areas for the purposes of safety and security of their students and staff. The iCan Campus Mobile Connect application enables students and staff to instantly alert security and police forces of, and orient security CCTV cameras toward, suspicious activity or matters that make them feel unsafe. The iCan Campus Mobile Connect is operable to provide an electronic campus map embedded with CCTV camera coverage areas. Pointing on a location of the map localizes the incident and produces a text screen or other type of user interface for users to enter a brief description of the observation or activity.

The iCan Campus Alert feature of the iCan system 10 enables students and staff to wander the campus with the knowledge that they may be placed under security watch, on-demand. It also serves as a deterrent to crime. Once the word gets out into the community that campus goers can instantly and on-demand place the virtual eyes of the police or security forces on suspected criminal activity, would-be criminals become weary of targeting college grounds for criminal activity.

The iCan system 10 enables capturing GPS or other location information signals from community members or residents to map and locate them on the ground, then pan and/or zoom one or more of the surveillance cameras 106 to locate their precise location and/or the location of an incident being reported. Also, the map resolution that is provided to a resident to pinpoint the location of an incident may be based on the position fix or IP address of the mobile device of that resident. So, if an area of coverage can be divided into 10 smaller areas, for example, the first map option that is provided can be the one smaller area that corresponds to the location of the person making the report. If that map resolution is not suitable (e.g., the event took place or is taking place in another of the smaller areas), then it is possible to zoom out to a larger map to select a camera.

The iCan system 10, which includes the iCan manager 100, may be integrated and/or customized with other systems. The iCan manager 100 may be operated with an Automated Emergency Response (AED) such as the automated dispatch protocol 102 described above with respect to FIG. 1. Personnel monitoring the iCan system 10 may utilize AED to expedite police/security responses to iCan emergency incident alert notifications. The AED may transform the emergency dispatch process into an automated transaction that takes just seconds to complete. Since AED can be integrated with GPS/Automated Vehicle Locator systems, it also automatically manages the location and assignment of the closest available police or security units, which reduces response time. Combined, these functionalities can help police/security dispatchers and iCan operators reduce the time it takes for police to arrive at the scene of an emergency. In some instances, the arrival time can be reduced by more than 50%. The AED may be triggered by communications center operators, CCTV camera monitors, and from within electronic mapping systems.

In another embodiment of the disclosure, the iCan manager 100 can be operated with a Light-Based Intervention System (LBIS) such as the light-based intervention system 104 described above with respect to FIG. 1. The LBIS can provide police/security CCTV camera/iCan monitoring personnel with instant intervention and crime prevention capabilities. This uniquely powerful force multiplier synchronizes with and transforms CCTV cameras into highly visible and interactive crime prevention tools. Upon observing a criminal incident requiring immediate police/security intervention, operators aim the CCTV camera at the incident location and activate a bright light source that illuminates the target area or suspect to indicate the incident is under active police surveillance.

The use of an LBIS in addition to the iCan system 10 can convey a powerfully persuasive message that police or security personnel are observing, recording, and/or responding to an incident. In many instances, this method of immediate intervention can result in disruption of a criminal or harmful act, even before police/security personnel arrive at the scene, because of the fear to the perpetrators of likely identification and apprehension.

FIGS. 3-11 are diagrams that illustrate examples of different user interface screenshots that are related to an interactive community alert network, in accordance with various embodiments of the disclosure. Referring to FIGS. 3-11, the iCan manager 100, which is described above with respect to FIG. 1 and FIG. 2, may be utilized to generate the user interfaces and to receive, process, handle, store, and/or communicate information obtained through the user interfaces. Moreover, the iCan manager 100 utilized to display, reproduce, and/or generate information that is presented in the used interfaces shown in FIGS. 3-11. The information that is output by the iCan manager 100 may be generated or produced in response to information that is received and/or processed by the iCan manager 100.

Figure 3:
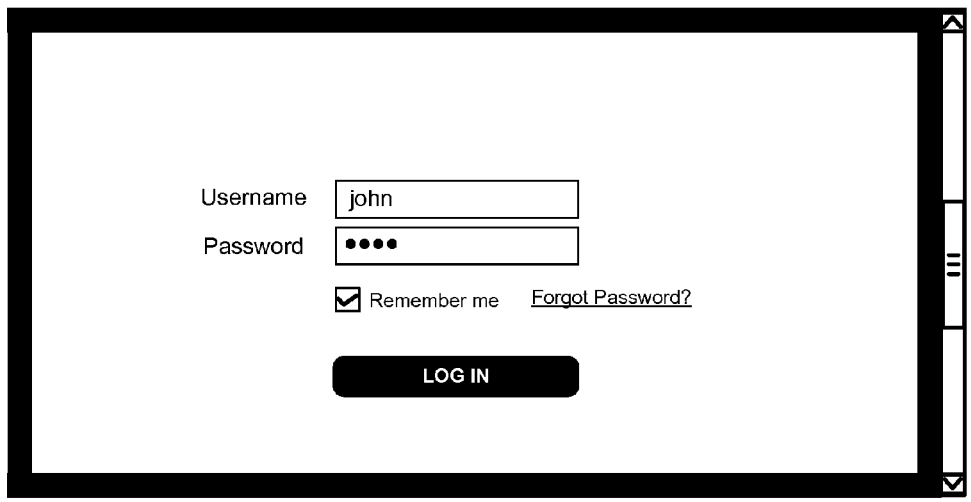
FIG. 3 is a diagram that illustrates an example of an interactive community alert network system login page, in accordance with an embodiment of the disclosure.

FIG. 3 is a diagram that illustrates an example of an interactive community alert network system login page, in accordance with an embodiment of the disclosure. Referring to FIG. 3, there is shown a login screen that is enables users to log into the iCan system 10. An authorized user is able to enter a username and password to access the interactive community alert network system. The login page also comprises a function that enables the username to be remembered.

The login page allows for the virtual resident or community user to log into the iCan System 10. The user will need their username and password, which may be provided by an iCan Representative from the policing facility. In some instances, a user may gain access to the iCan System 10 through a public access portal without the need for a username and password. When a user inserts their valid username and password into the login screen, followed by clicking the Log In button they will be logged into the user's iCan Dashboard.

Figure 4:
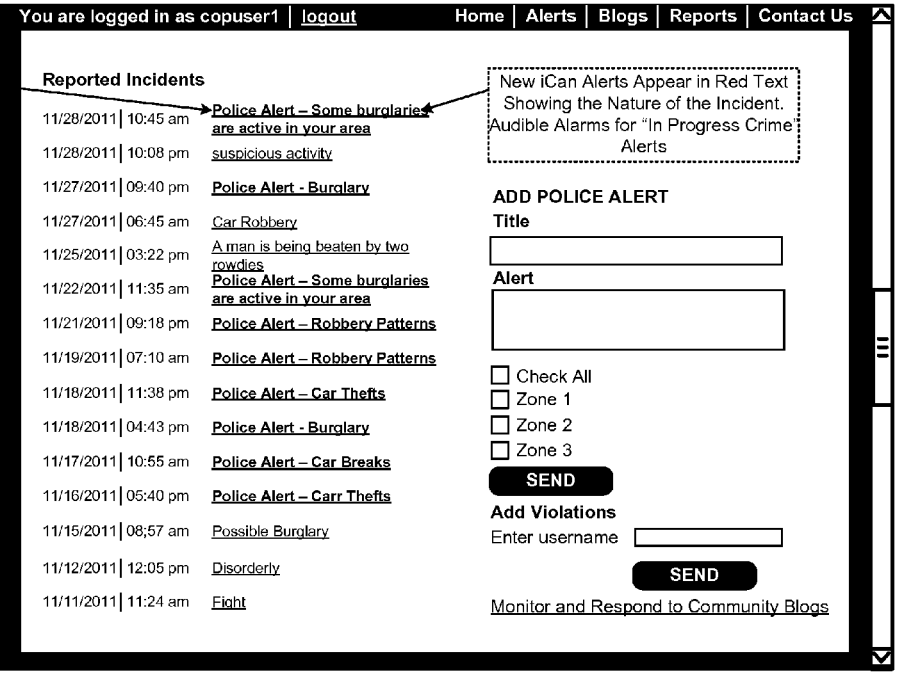
FIG. 4 is a diagram that illustrates an example of a police interactive community alert network monitoring page, in accordance with an embodiment of the disclosure.

FIG. 4 is a diagram that illustrates an example of a police interactive community alert network monitoring page, in accordance with an embodiment of the disclosure. Referring to FIG. 4, there is shown exemplary information that may be displayed on the iCan monitoring page. In this regard, alerts may be displayed in red. Additionally, the entries in the iCan monitoring page may be hyperlinked so that clicking on an entry provides a more detailed view of the entry. For example, (1) shows a new message alert and (2) shows that an officer may click on the new message alert in order to load a new screen related to that new message alert. The information displayed on the iCan monitoring page may be color coded to aid the viewing. The iCan monitoring page may also show the status of each alert and different colors may be utilized to show whether or not an alert has been acknowledged.

FIG. 4 also illustrates an entry field that enables a user (police) to create a police alert by entering a title for the alert and the corresponding details for the alert. Depending of the operating zone within the region that is serviced by the iCan system 10, the user may select what operating zone should receive the created police alert. In instances where the iCan system 10 may have reciprocal agreements and connections, with other iCan systems, although not shown, options may be provided to select whether the created alert should be dispatched to the other iCan systems.

FIG. 4 also illustrates an entry field that enables a user (police) to create a violation alert. In instances where a community user may misuse the system and violate the terms and conditions of the iCan system 10, the police and/or security personal user may create a violation alert that may be sent to the user. A field is provided for entering the name of the community user that is in violation.

FIG. 4 also shows an exemplary drop down menu that enables a user (police) to select one or more options that may be utilized to conclude the incident and inform the reporter of the outcome of the incident.

Figure 5:
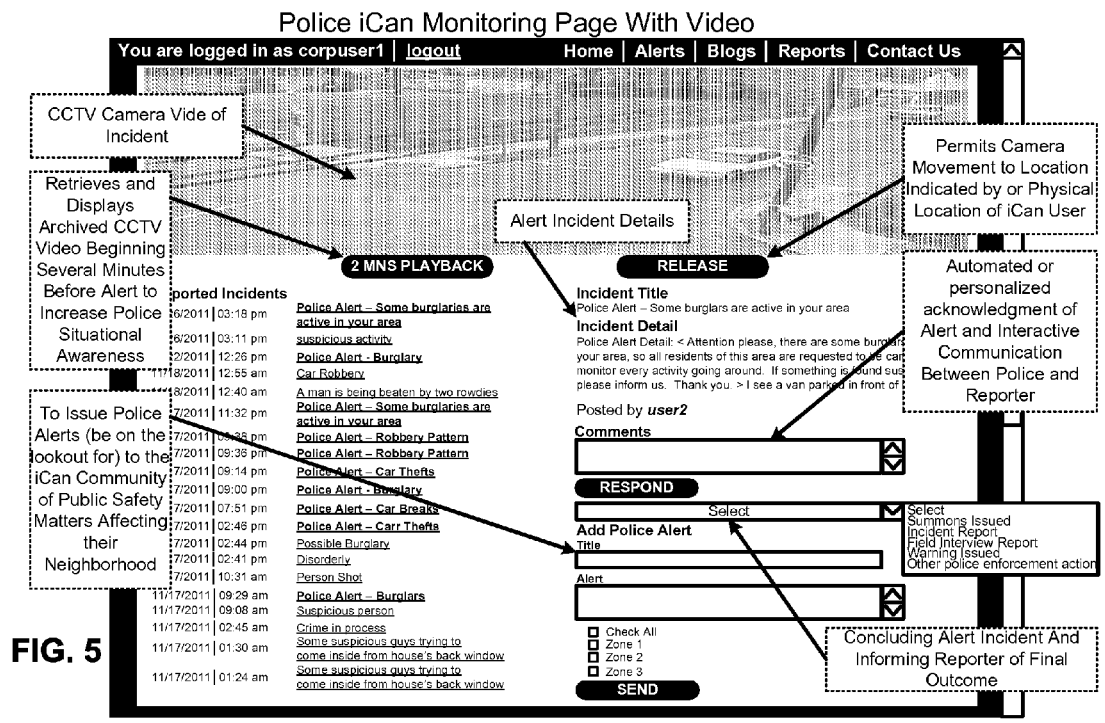
FIG. 5 is a diagram that illustrates an example of a system reporter interactive community alert network reporting page, in accordance with an embodiment of the disclosure.

FIG. 5 is a diagram that illustrates an example of a system reporter interactive community alert network reporting page, in accordance with an embodiment of the disclosure. Referring to FIG. 5, there is shown a camera view of a reported incident. The camera view may be generated based on a panoramic view of the area of the incident that is displayed on the community user device that is utilized to report the incident. The user of the community user device that is utilized to report the incident may click on a region of the panoramic view of the area of the incident and the iCan system 10 is operable to train the surveillance cameras 106 in that region to view the region in order to get a more detailed view. The user (police) may also provide a community user with the capability to control the operation of one or more of the surveillance cameras 106. In order for this to occur, the user (police) has to release the movement of the surveillance cameras 106 to the incident location. Once this is done, the community user may control the operation of one or more of the surveillance cameras 106 to better train the surveillance cameras 106 on the reported incident location.

There is also a capability to playback previously captured video/audio content. For example, the previous 2 minutes of video/audio content may be retrieved and played back in order to get a better understanding of the incident. There is also shown an area that allows a user (police) to enter and issue an alert. FIG. 4 also shows a field that enables a user (police) to enter information that may be utilized to acknowledge an incident and communicate with a reporter of the incident. In an exemplary embodiment of the disclosure, this field may enable a user (police) to communicate with a reporter of an incident using text messages and/or using a smartphone application (app).

Figure 6:
FIG. 6 is a diagram that illustrates an example of a police interactive community alert network monitoring page, in accordance with an embodiment of the disclosure.

FIG. 6 is a diagram that illustrates an example of a police interactive community alert network monitoring page, in accordance with an embodiment of the disclosure. Referring to FIG. 6, there is shown exemplary information that may appear in a police issued alert. The police issued report may appear on the police iCan system 10 view and also on the community user view.

FIG. 7 is a diagram that illustrates an example of an interactive community alert network blog page, in accordance with an embodiment of the disclosure. Referring to FIG. 7, there is shown exemplary contents of an blog page that appears on the police iCan system 10 and also on the community user view. Community users as well as the police may participate in blogs. If in instances where the police may not be able to participate in a blog, then police may possess the capability to view the blog.

FIG. 8 is a diagram that illustrates an example of an interactive community alert network activity report page, in accordance with an embodiment of the disclosure. Referring to FIG. 8, there is shown exemplary contents of an iCan activity report. Reports may be generated by the iCan system 10 on a periodic or aperiodic basis. For example, daily, weekly, monthly, quarterly, annually and/or as-needed or on-demand reports may be generated.

Figure 9:
FIG. 9 is a diagram that illustrates an example of resident or interactive community alert network user site, in accordance with an embodiment of the disclosure.

FIG. 9 is a diagram that illustrates an example of resident or interactive community alert network user site, in accordance with an embodiment of the disclosure. Referring to FIG. 9, there is shown exemplary information may appear on a resident or iCan user site or view. The entries in the resident or iCan user site or view may be hyperlinked so that clicking on an entry may provide more details of the entry. A record of all user reported incidents are displayed and may be viewed by clicking on the corresponding hyperlinked entry. A resident can click on a the response button in order to respond to an alert.

FIG. 10 is a diagram that illustrates an example of an interactive community alert network resident or user reporting page, in accordance with an embodiment of the disclosure. Referring to FIG. 10, there is shown exemplary information that may be displayed or presented on a resident or user reporting page. This information may comprise a field that enables a community user to enter a title for the incident being reported and also details of the incident being reported. This information may also comprise a field that enables a community user to select the category that is associated with the reported incident, for example, a robbery and also select the location of the reported incident.

FIG. 10 also shows the panoramic view of the area of the incident that is displayed on the community user device that is utilized to report the incident. The user of the community user device that is utilized to report the incident may click on a region of the panoramic view of the area of the incident and the iCan system 10 is operable to train the surveillance cameras 106 on that area. This will give the user (police) a better view of the area within the vicinity of the reported incident and assist with localizing the event. If the user (police) has released the movement of the surveillance cameras 106 to the incident location, then the community user may control the operation of one or more of the surveillance cameras 106 to better train the surveillance cameras 106 on the reported incident location.

FIG. 10 also illustrates fields for the community user reporting the incident to engage in a dialog with the user (police). The incident reporting page has the iCan camera display of the location, which the user can report on. When a user wants to report an incident, the user may click onto the area of the picture where the issue is occurring. The user may insert a title, which is a short description of the incident, in the title area. Details of the incident may also be posted. The user may then select from a plurality of categories, which best matches the incident. Exemplary categories may comprise suspicious activity, crime in progress, Quality of Life, person in need of assistance, and other or miscellaneous. If a crime is in progress is selected, a pop-up or other alert may be presented instructing the community user to dial an emergency number such as 911. The user may select the camera using the dropdown box, which had the panorama which they used to produce their report. This entry enables the police or policing authority officer to know which camera to view based on the panorama that was selected. Once the entries are completed, the community user may click the send button to report the incident. After the incident is reported, the page will refresh in, for example, 5 seconds and will automatically direct the reporting community user to the Home Page, which is the place where community users may continue to communicate with the iCan representative on duty. This process is provided as an example and not as a limitation. Other processes may be utilized in connection with reporting an incident, including variations on the process outlined above.

FIG. 11 is a diagram that illustrates an example of an interactive community alert network resident incident monitoring page, in accordance with an embodiment of the disclosure. Referring to FIG. 11, there is shown exemplary information that may be presented on a resident incident monitoring page. This information provides details of the previously reported incident to which the police have already responded. Dialogs between the community users of the iCan system 10 and the police are presented in the resident incident monitoring page. The community users and/or the police may post comments and/or respond to the presented incidents on the resident incident monitoring page.

FIGS. 12-30 are each diagrams that illustrate examples of different user interface screenshots that are used by police or security personnel in an interactive community alert network, in accordance with various embodiments of the disclosure. Referring to FIGS. 12-30, the iCan manager 100 described above with respect to FIGS. 1 and 2 can be used to generate the user interfaces and to receive, process, handle, store, and/or communicate information obtained through the user interfaces. Moreover, the iCan manager 100 can be used to display, reproduce, and/or generate information that is presented in the user interfaces shown in FIGS. 12-30. The information that is output by the iCan manager 100 can be produced in response to information that is received by the iCan manager 100.

Figure 12:
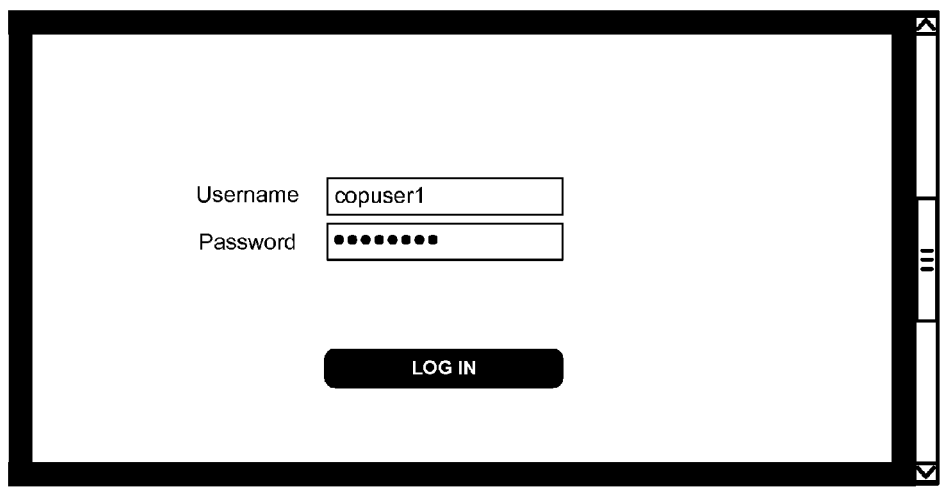
FIG. 12 is a diagram that illustrates an example of an interactive community alert network community user, police or security personnel login page, in accordance with an embodiment of the disclosure.

FIG. 12 is a diagram that illustrates an example of an interactive community alert network community user, police or security personnel login page, in accordance with an embodiment of the disclosure. Referring to FIG. 12, there is shown a login page that may be utilized by authorized community users, police or security personnel login page to access the iCan system 10. For example, the login page allows police or security personnel to log into the iCan System 10. An administrator such as the police or other user may need a username and password, which can be provided by an iCan representative from the police facility. After the administrator or other user enters a valid username and password into the corresponding login fields, they may click the Log In button and be will be logged into a default home screen or a customized screen such a user's iCan Dashboard.

Figure 13:
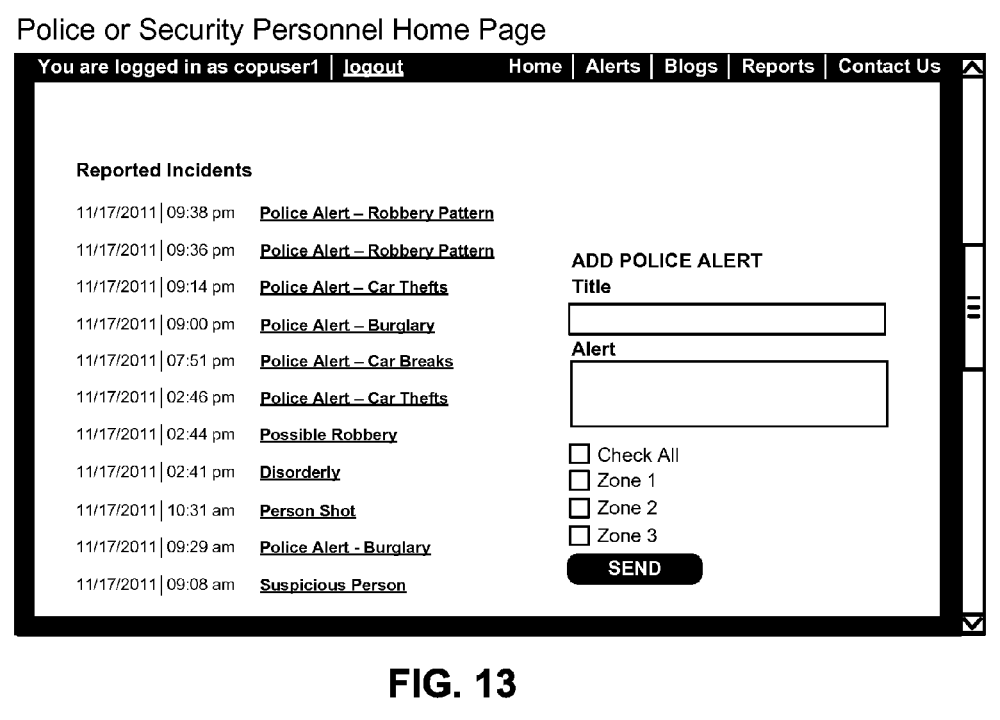

FIG. 13 is a diagram that illustrates an example of an interactive community alert network police or security personnel home page, in accordance with an embodiment of the disclosure. Referring to FIG. 13, there is shown exemplary information that may be displayed on the police or security personnel home page of the iCan system 10.

The homepage is the central location for interacting with the iCan System. The iCan homepage may comprise the following exemplary information: monitoring incident report, monitoring police alerts, add police alert, add violation and monitor and respond to community blogs. In an exemplary embodiment of the disclosure, the links on the homepage may comprise different colors, with each color indicating a different status or category. For example, the following colors may be utilized for a particular crime incident report: an incident may be displayed in red when a new incident reported by user; an incident may be displayed in black when the last comment has been made by user; and an incident may be displayed in blue when the last comment has been made by the police. Other colors may also be utilized. After the last comment is made on an incident by the police, if the user doesn't reply within a certain time period, for example 5 hours, then the reported incident will turn into inactive. The time period may be modified and may depend on the particular incident that is reported.

FIG. 14 is a diagram that illustrates an example of an interactive community alert network monitoring incident report page, in accordance with an embodiment of the disclosure. Referring to FIG. 14, there is shown exemplary information that may be displayed on a monitoring incident report page. The information may be hyperlinked to provide more information on a particular entry. Updates for a reported incident may also be displayed on the monitoring incident report page.

An administrator or user of the iCan system 10 can get updates over a number of the latest 50 incident reports, for example. The number of updates may be programmed or modified. The administrator or user of the iCan system 10 may comment on latest 50 incident reports. Again, the number of comments can be programmed or modified. The administrator or user of the iCan system 10 may also close the incident case indicating one or more actions related to the incident were carried out.

FIG. 15 is a diagram that illustrates an example of an interactive community alert network incident report view and response page, in accordance with an embodiment of the disclosure. FIG. 15 is an extension to FIG. 14 and shows additional details that may be displayed on the monitoring incident report page.

An administrator or user may get updates over latest, for example 50 combined incident reports and police alert. This number may be programmed or modified. The administrator or user may also be able to comment on any portion of, for example, the latest 50 combined incident reports and police alert. This number can be programmed or modified.

Figure 16:
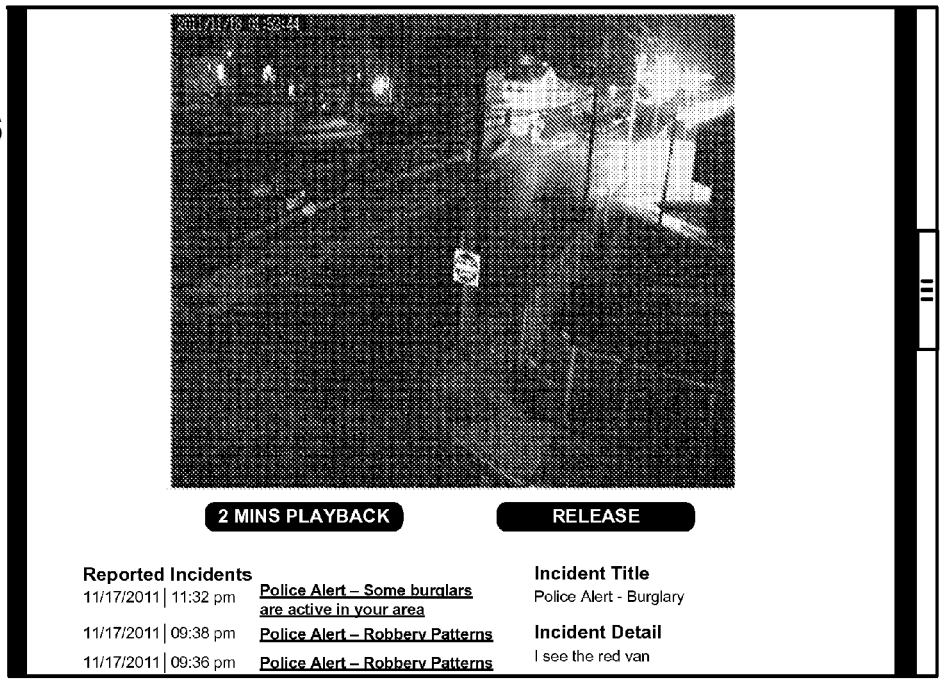
FIG. 16 is a diagram that illustrates an example of an interactive community alert network incident report camera view page, in accordance with an embodiment of the disclosure.

FIG. 16 is a diagram that illustrates an example of an interactive community alert network incident report camera view page, in accordance with an embodiment of the disclosure. Referring to FIG. 16, there is shown information on an exemplary incident report camera view page, which allows, for example, a 2 minute playback of audio and/or video prior to the reporting time. This will provide information on what occurred at the incident location 2 minutes prior the incident being reported.

In FIG. 16, if the user has provided the incident location at the time of reporting then the administrator or user of the iCan system may be able to see the current camera view of that reported incident by clicking on the incident, which is a hypertext link. The default view may be the current view of the camera. The administrator of the iCan system may view the 2 minutes playback of the same camera by clicking "2 MINS PLAYBACK" button. The amount of time for the playback may be programmable or modified. The administrator can have the current view of the exact location, which the user indicated at the time of reporting the incident.

FIG. 17 is a diagram that illustrates an example of an interactive community alert network incident report closing page, in accordance with an embodiment of the disclosure. Referring to FIG. 17, there is shown exemplary information related to the closing of an incident report. The details of the incident may be displayed as well as other comments. The administrator or user (police) may enter information stating that, for example, "Suspects have been arrested." There is also shown fields for the user (police) to add and enter information for a police alert. The administrator or user may close the police alert/reported incident and indicate that one or more action were carried out FIG. 18 is a diagram that illustrates an example of an interactive community alert network incident report closing page, in accordance with an embodiment of the disclosure. FIG. 18 is an extension to FIG. 17 and shows additional details that may be displayed for reporting and closing and incident report.

FIG. 19 is a diagram that illustrates an example of an interactive community alert network police or security personnel report page, in accordance with an embodiment of the disclosure. Referring to FIG. 19, there is shown exemplary information for a police or security personnel report page. Reports may be generated by the iCan system 10 on a periodic or aperiodic basis. For example, daily, weekly, monthly, quarterly, annually and/or as-needed or on-demand reports may be generated. This may help the police so that they do not drop the ball on a reported incident.

If an incident is reported by a community user, the administrator or user will be informed about the arrival of new incident report. If a community user has reported a "Crime in progress" somewhere, as soon the community user clicks on "SEND" button, the admin or user of the iCan system is immediately informed at the home page about the incident with an audio and/or visual alert, since this type of incident may require immediate attention and/or response.

FIG. 20 is a diagram that illustrates an example of an interactive community alert network add police alert page, in accordance with an embodiment of the disclosure. Referring to FIG. 20, there is shown exemplary information for a user (police) to enter a police alert. This page allows an administrator or user of the iCan system to post alerts. The administrator or user may enter an alert title, content and check the zones where that alert needs to be posted. If the alert is to be posted in all the given zones, the administrator or user may select the "Check All" option.

Depending of the operating zone within the region that is serviced by the iCan system 10, the user may select what operating zone should receive the created police alert. In instances where the iCan system 10 may have reciprocal agreements and connections with other iCan systems, although not show, options may be provided to select whether the created alert should be dispatched to the other iCan systems.

FIG. 21 is a diagram that illustrates an example of an interactive community alert network add violation page, in accordance with an embodiment of the disclosure. Referring to FIG. 21, there is shown a field that enables a user (police) to enter a violation for a community user that has abused the iCan system 10. A community user may be allowed a certain amount of violations before access to the iCan system 10 is revoked or other action is done.

The administrator or user of the iCan system finds community user posting that may be unserviceable or contains inappropriate or unacceptable content, the administrator or user can restrict that community user from doing so by creating a violation for the community user's username. The administrator or user may enter the username of the community member to be restricted and click on "SEND."

FIG. 22 is a diagram that illustrates an example of an interactive community alert network add violation and blog page, in accordance with an embodiment of the disclosure. FIG. 22 is an extension to FIG. 23 and shows additional details that enables monitoring and responding to community blogs. To continue monitoring the current blog, the administrator or user can click on "Monitor and Respond to Community Blogs" and the administrator or user will be redirected to blog page.

Figure 23:
FIG. 23 is a diagram that illustrates an example of an interactive community alert network police or security personnel alerts page, in accordance with an embodiment of the disclosure.

FIG. 23 is a diagram that illustrates an example of an interactive community alert network police or security personnel alerts page, in accordance with an embodiment of the disclosure. Referring to FIG. 23, there is shown exemplary information that may be displayed on a police or security personnel alerts page. The information may comprise recent police alerts. The administrator or user can view the details of all the 50 latest updated alerts made by police or security personnel. This number can be programmed or modified. To post a new alert, there is a link "To Post Alert, Go to Home Page" which will redirect the administrator or user to the home page where the administrator or user can add a new alert.

Figure 24:
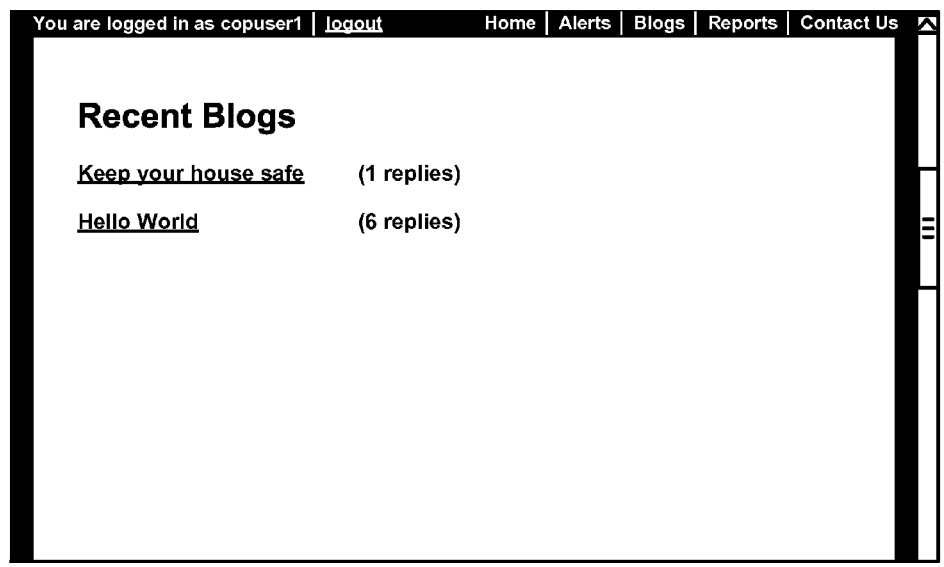
FIG. 24 is a diagram that illustrates an example of an interactive community alert network police or security personnel blogs page, in accordance with an embodiment of the disclosure.

FIG. 24 is a diagram that illustrates an example of an interactive community alert network police or security personnel blogs page, in accordance with an embodiment of the disclosure. Referring to FIG. 24, there is shown a detailed view of an exemplary blog. The blog is shown along with fields for entering username and enter comments. The administrator or user can view 50 latest updated blogs, which were either created by a community user or by the police themselves. This number can be programmed or modified. In order to view the details of any blog, the administrator may click on its link.

Figure 26:
FIG. 26 is a diagram that illustrates an example of deleting an interactive community alert network police or security personnel blog page, in accordance with an embodiment of the disclosure.

FIG. 25 is a diagram that illustrates an example of a detailed view of an interactive community alert network police or security personnel blogs page, in accordance with an embodiment of the disclosure. Referring to FIG. 26, there is shown exemplary information for a blog.

FIG. 26 is a diagram that illustrates an example of deleting an interactive community alert network police or security personnel blog page, in accordance with an embodiment of the disclosure. Referring to FIG. 26, there is shown exemplary information for deleting a blog. In order to delete a blog, the admin or user may click on "Delete Blog." After successful deletion of a blog, the administrator or user will be redirected to a Blog List page.

FIG. 27 is a diagram that illustrates an example of an interactive community alert network add violation blog page, in accordance with an embodiment of the disclosure. Referring to FIG. 27, there is shown exemplary information for adding a violation to a blog. For example, the violation may be a terms and conditions violation. In this regards, a violation may be issued to any community user of the iCan system 10 that has violated the iCan terms and usage policy. In order to restrict a blog from having unserviceable or inappropriate content, the administrator or user can enter the username a community user that posted the unserviceable or inappropriate content. The administrator or user can click on "SEND."

FIG. 28 is a diagram that illustrates an example of an interactive community alert network police or security personnel report page, in accordance with an embodiment of the disclosure. Referring to FIG. 28, the admin can view the details of all the iCan activities like iCan Alert Categories, iCan Alert Disposition, and so one either week-wise or month-wise, for example. The span of time over which the admin can view details can be programmed or modified. A week-wise iCan report is illustrated.

FIG. 29 is a diagram that illustrates an example of an interactive community alert network report month-wise page, in accordance with an embodiment of the disclosure. Referring to FIG. 29, there is shown exemplary information that may be presented for a police or security personnel report. For example, the report may comprise information related to the alert activity, alert category, and/or alert disposition.

Figure 30:
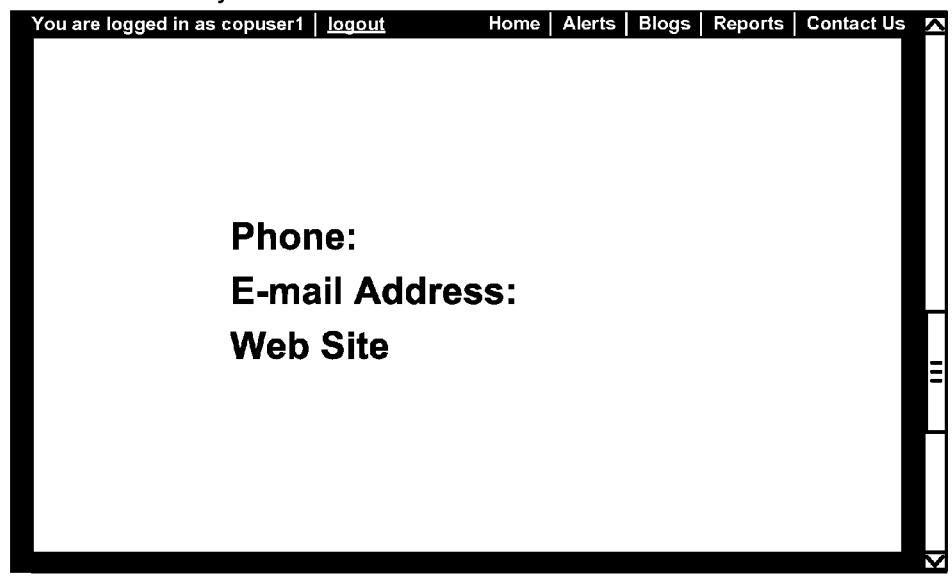
FIG. 30 is a diagram that illustrates an example of an interactive community alert network police or security personnel contact us page, in accordance with an embodiment of the disclosure.

FIG. 30 is a diagram that illustrates an example of an interactive community alert network police or security personnel contact us page, in accordance with an embodiment of the disclosure. Referring to FIG. 29, there is shown exemplary information that may be presented for contacting the police or security personnel along with any inquiries.

FIGS. 31-44 are diagrams that illustrate examples of different user interface screenshots that are used by community or neighborhood members in an interactive community alert network, in accordance with various embodiments of the disclosure. Referring to FIGS. 31-44, the iCan manager 100 described above with respect to FIGS. 1 and 2 is operable to generate the user interfaces and to receive, process, handle, store, and/or communicate information obtained through the user interfaces. Moreover, the iCan manager 100 can be used to display, reproduce, and/or generate information that is presented in the user interfaces shown in FIGS. 31-44. The information that is output by the iCan manager 100 can be produced in response to information that is received by the iCan manager 100.

FIG. 31 is a diagram that illustrates an example of an interactive community alert network forgotten password page, in accordance with an embodiment of the disclosure. Referring to FIG. 31, there is shown exemplary information that may be presented and utilized to assist with gaining access to the iCan system 10 when the user (police) and/or community user has forgotten their password.

The forgotten password functionality is used to allow for a user who has lost, misplaced or forgotten their password the ability to reset their password from a self-service perspective. When the user clicks onto the forgotten password link, they will be prompted to enter their username. By entering their username, an email will automatically be sent to the email address listed under the user's account with their password. The user will then be able to use their password to log into the system.

The user is asked to answer all or some of the questions that he/she were asked at the time of the creation of his/her account. Only after giving the correct answers to the appropriate questions, clicking on the "Submit" button, he/she will be provided his/her password.

Figure 32:
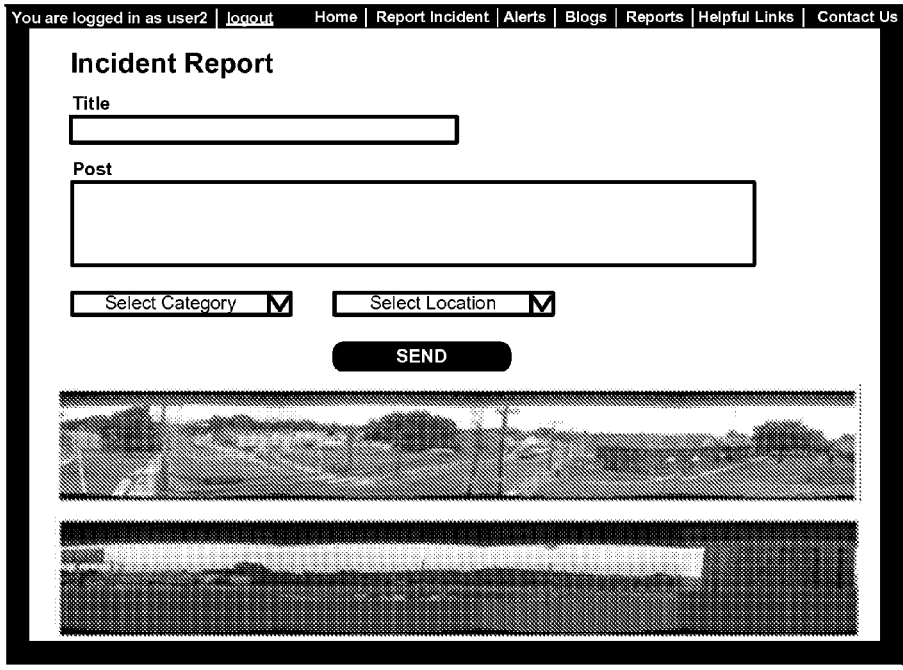
FIG. 32 is a diagram that illustrates an example of an interactive community alert network resident or user reporting page, in accordance with an embodiment of the disclosure.

FIG. 32 is a diagram that illustrates an example of an interactive community alert network resident or user reporting page, in accordance with an embodiment of the disclosure. Referring to FIG. 32, there is shown exemplary information that may be displayed or presented on a resident or user reporting page. This information may comprise a field that enables a community user to enter a title for the incident being reported and also details of the incident being reported. This information may also comprise a field that enables a community user to select the category that is associated with the reported incident, for example, a robbery and also select the location of the reported incident.

A panoramic view of the area of the incident that is displayed on the community user device that is utilized to report the incident is also illustrated in FIG. 32. The user of the community user device that is utilized to report the incident may click on a region of the panoramic view of the area of the incident and the iCan system 10 is operable to train the surveillance cameras 106 on that area. This will give the user (police) a better view of the area within the vicinity of the reported incident and assist with localizing the event. If the user (police) has released the movement of the surveillance cameras 106 to the incident location, then the community user may control the operation of one or more of the surveillance cameras 106 to better train the surveillance cameras 106 on the reported incident location. FIG. 32 is similar to FIG. 10 with the addition of a second panoramic view.

Figure 33:
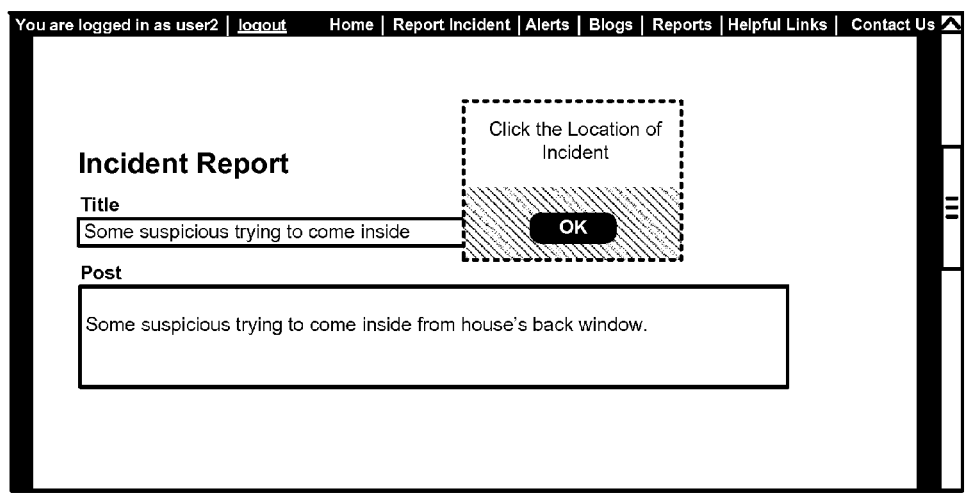
FIG. 33 is a diagram that illustrates an example of an interactive community alert network selection of camera for still or moving images for resident incident reporting page, in accordance with an embodiment of the disclosure.

FIG. 33 is a diagram that illustrates an example of an interactive community alert network selection of camera for still or moving images for resident incident reporting page, in accordance with an embodiment of the disclosure. Referring to FIG. 33, there is shown exemplary information that may be presented for selecting one or more of the surveillance cameras 106 for still or moving images for the resident incident reporting page If the community user does not specify which camera should be utilized, the community user has to click onto given panoramic pictures when that incident is actually occurring.

Figure 34:
FIG. 34 is a diagram that illustrates an example of an interactive community alert network resident incident reporting page, in accordance with an embodiment of the disclosure.

FIG. 34 is a diagram that illustrates an example of an interactive community alert network resident incident reporting of a crime in progress page, in accordance with an embodiment of the disclosure. Referring to FIG. 34, there is shown exemplary information that may be displayed when a resident is reporting a crime in progress. If there is a crime going on somewhere, the community user need not give the description of entire incident and instead of reporting a "crime in progress", the community user is suggested to call 911 immediately for an immediate response.

Figure 35:
FIG. 35 is a diagram that illustrates an example of an interactive community alert network resident community home page, in accordance with an embodiment of the disclosure.

FIG. 35 is a diagram that illustrates an example of an interactive community alert network resident community home page, in accordance with an embodiment of the disclosure. Referring to FIG. 35, there is shown exemplary information that may be displayed on a iCan home page. The iCan home page may be utilized as the central location for interacting with the iCan system 10. The iCan Homepage comprises the following exemplary information:
1. Reported Incidents
   Displays the last 20 incidents which are reported by the user
   Allows for the user to leave a comment for the iCan officer
2. Recent Police Alerts
   Displays the 20 most recent police alerts
   Allows for user to respond to the alert
3. Recent Blogs
   Displays the most recent blogs
   Displays how many replies have been added to each blog entry
4. Helpful Links
   Displays helpful links
   Other information may also be available.

FIG. 36 is a diagram that illustrates an example of an interactive community alert network resident discussion page, in accordance with an embodiment of the disclosure. Referring to FIG. 36, there is shown exemplary information that may be presented on a resident discussion page. The resident discussion page enables live and/or non-real-time discussions and the information displayed in the resident discussion page may be hyperlinked to provide additional details and/or resources for incidents being discussed.

The community user may have a live discussion related to some or all of the currently active reported crimes. In an exemplary embodiment of the disclosure, the link of particular crime incident report may be displayed in red when new incident reported, displayed in black if last comment has been made by the community use, and displayed in blue if last comment had been by the cop. Other colors and/or identifiers may also be utilized.

FIG. 37 is a diagram that illustrates an example of an interactive community alert network resident alerts page, in accordance with an embodiment of the disclosure. Referring to FIG. 37, there is shown exemplary information that may be presented on a resident alert page. The recent police alerts that are provided by the iCan user (police) may be listed on the resident alerts page. The iCan community users may click on the alerts and provide details for the officers. If the community user wants to respond to a currently active police alert, the community user may click on "RESPOND" button and the community user will be redirected to the incident report area where the community user may enter corresponding information for the selected alert.

Figure 39:
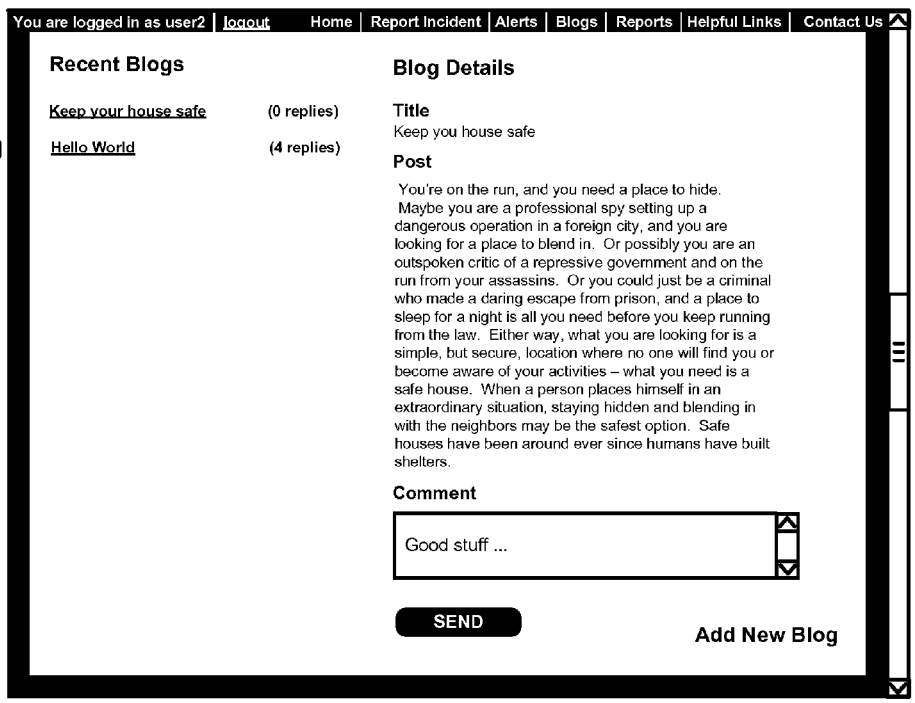
FIG. 39 is a diagram that illustrates an example of an interactive community alert network resident blog view and posting page, in accordance with an embodiment of the disclosure.

FIG. 38 is a diagram that illustrates an example of an interactive community alert network resident reporting page, in accordance with an embodiment of the disclosure. Referring to FIG. 38, there is shown exemplary information that may be presented on the resident reporting page. The resident reporting page also has a blog which provides the users an outlet to write their thoughts. On this page users may do one or more of the following:
1. Read a blog
2. Add a new blog
3. Read comments
4. Posted to blog
5. Post comments to blog FIG. 39 is a diagram that illustrates an example of an interactive community alert network resident blog view and posting page, in accordance with an embodiment of the disclosure. Referring to FIG. 39, there is shown exemplary information that may be presented on resident blog view and posting page. If a community user and/or a policing authority user wants to post reviews over some existing blog, the community user and/or a policing authority user may write their views in the given text input field, and click on "SEND" button.

FIG. 40 is a diagram that illustrates an example of an interactive community alert network resident blog creation page, in accordance with an embodiment of the disclosure. Referring to FIG. 40, there is shown exemplary information that may be presented on the resident blog creation page. If the community user wants to add a new blog, which will be open for all the users as well as the cops, the community user can click on "Add New Blog" link where the community user may give the blog title content and click on "SEND" button.

FIG. 41 is a diagram that illustrates an example of an interactive community alert network resident reporting page showing report activities, in accordance with an embodiment of the disclosure. Referring to FIG. 41, there is shown exemplary information that may be presented on resident reporting page showing report activities.

If a community user wants to review some or all the iCan activities, the community user can click on "Reports" where the corresponding iCan activities may be viewed and/or generated as permissible. Reports may be generated by the iCan system 10 on a periodic or aperiodic basis. For example, daily, weekly, monthly, quarterly, annually and/or as-needed or on-demand reports may be generated.

Figure 42:
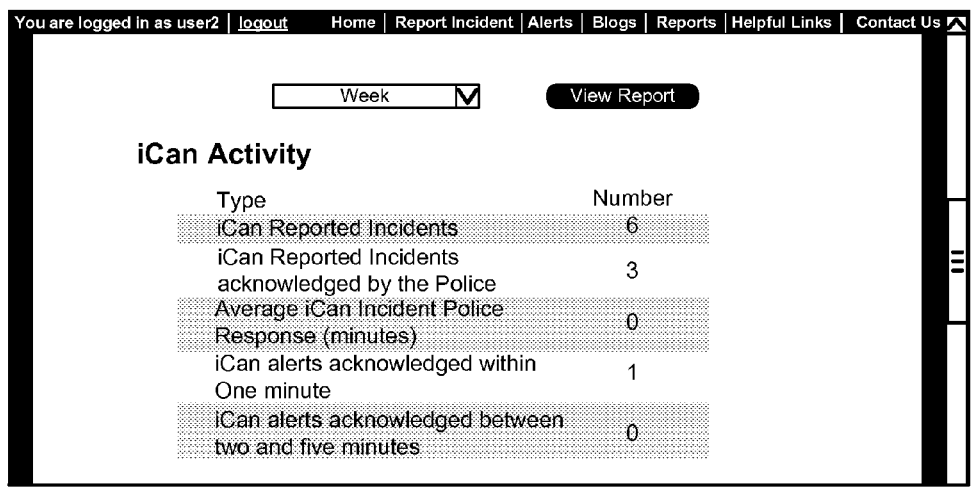
FIG. 42 is a diagram that illustrates an example of an interactive community alert network resident week-wise reports page, in accordance with an embodiment of the disclosure.

FIG. 42 is a diagram that illustrates an example of an interactive community alert network resident week-wise reports page, in accordance with an embodiment of the disclosure. Referring to FIG. 42, there is shown exemplary information that may be presented on a weekly analysis. If the community user wants to see the report on a week-wise basis, that community user may select the option "Week" from given options and the iCan activities will generate a week-wise report.

Figure 43:
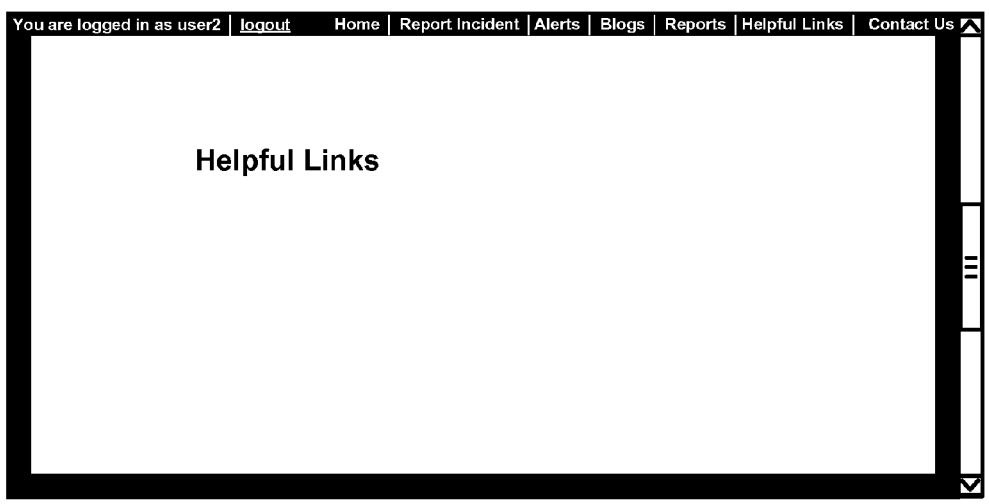
FIG. 43 is a diagram that illustrates an example of an interactive community alert network resident helpful links page, in accordance with an embodiment of the disclosure.

FIG. 43 is a diagram that illustrates an example of an interactive community alert network resident helpful links page, in accordance with an embodiment of the disclosure. Referring to FIG. 43, there is shown exemplary information that may be presented on resident helpful links page. The exemplary information may comprise URLs and/or other resources such as videos, articles, FAQs, white papers, and other materials.

Figure 44:
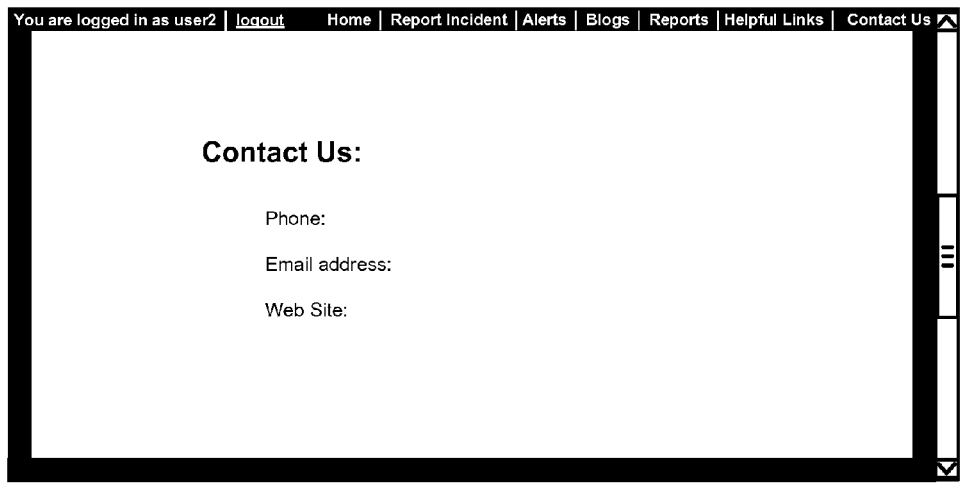
FIG. 44 is a diagram that illustrates an example of an interactive community alert network resident contact us page, in accordance with an embodiment of the disclosure.

FIG. 44 is a diagram that illustrates an example of an interactive community alert network resident contact us page, in accordance with an embodiment of the disclosure. Referring to FIG. 44, there is shown exemplary information that may be presented on resident contact us page. The exemplary information may comprise telephone numbers, fax numbers, email addresses, SMS numbers, and website URL.

FIGS. 45-48 are each a flow diagram that illustrate examples of operations for an interactive community alert network, in accordance with various embodiments of the disclosure.

Figure 45:
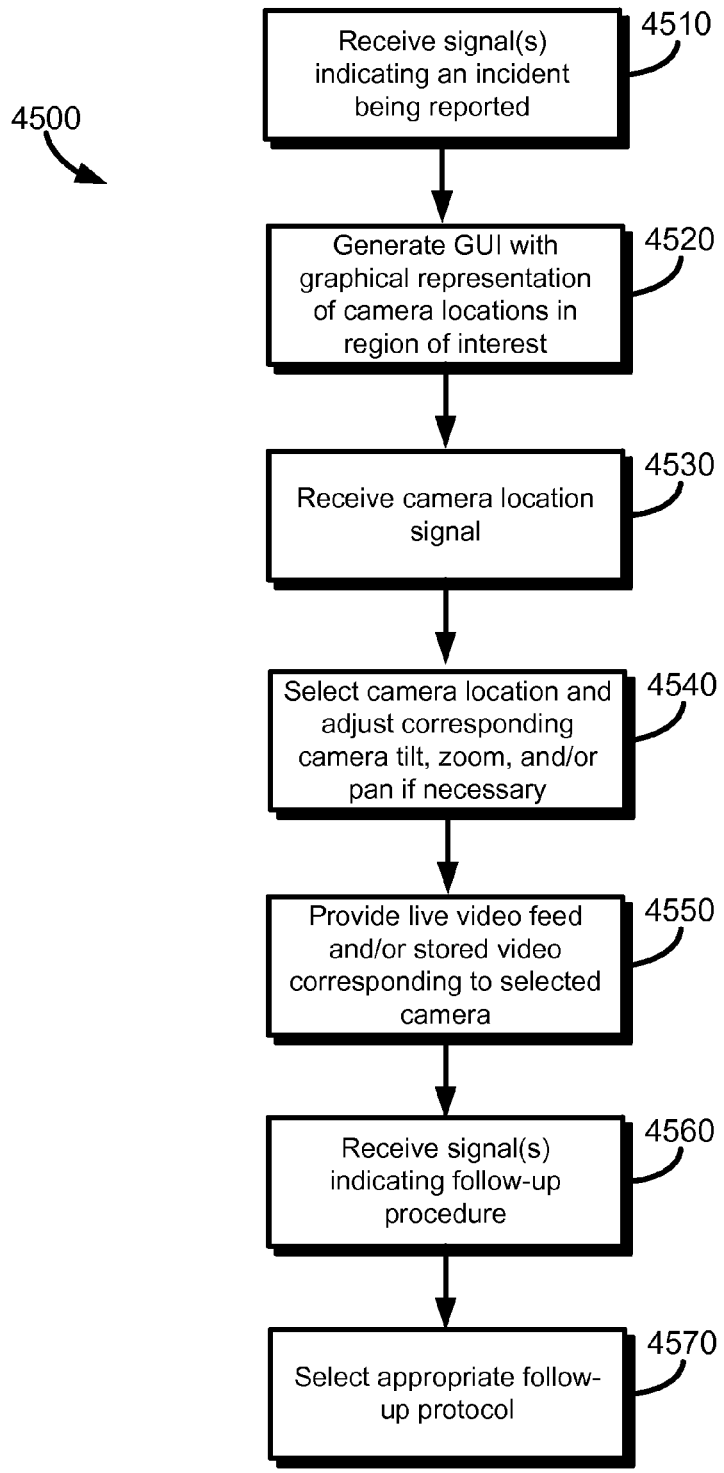
FIGS. 45-48 are each a flow diagram that illustrate examples of operations for an interactive community alert network, in accordance with various embodiments of the disclosure.

Referring to FIG. 45, there is shown a flow chart 4500 in which, at step 4510, the iCan manager 100 can receive one or more signals from one of the community users (e.g., residents, community members) to indicate that an incident is being reported. The indication can provide information as to the type of the incident that is believed to have taken place or that is believed to be taking place. Such signals may be generated in response to a community user providing information to a graphical user interface generated by the iCan manager and made available at a pre-determined website and/or via an application.

At step 4520, based at least on the information received in step 4510, the iCan manager 100 can generate a graphical user interface that comprises a map or other graphical representation of a region or area in which the one or more surveillance cameras 106 are located. The map or region that is provided corresponds to a region of interest based on the incident that is being reported.

At step 4530, the iCan manager 100 may be operable to receive a camera location signal or signals that are provided in response to the community user identifying in the map a particular position or location where the incident being reported is believed to have taken place or is believed to be taking place. At step 4540, the iCan manager 100 may be operable to select one or more cameras (e.g., surveillance cameras 106) and may be operable to generate signals to control one or more of a tilt, zoom, and pan of each of the selected cameras to orient the cameras in the direction of the incident being reported.

At step 4550, the iCan manager 100 may be operable to provide a live video feed of the selected cameras to police or security personnel accessing the iCan manager 100 via a website or other application. The iCan manager 100 may also be operable to provide previously stored video content corresponding to the one or more selected cameras in response to a signal received requesting such content. For example, police or security personnel may generate a request for such content to get better context of the events that lead to the incident being reported.

At step 4560, the iCan manager 100 can receive one or more signals that indicate the type of follow-up procedure that is to be used to address the reported incident. At step 4570, the iCan manager 100 can select one of a plurality of protocols to follow for a particular procedure. For example, when an alert and/or an update is to be generated and distributed through the iCan system 10, the iCan manager 100 may generate appropriate alerts and/or updates that can be communicated to the community users, the automated dispatch protocol 102, and/or to the light-based intervention system 104.

Figure 46:
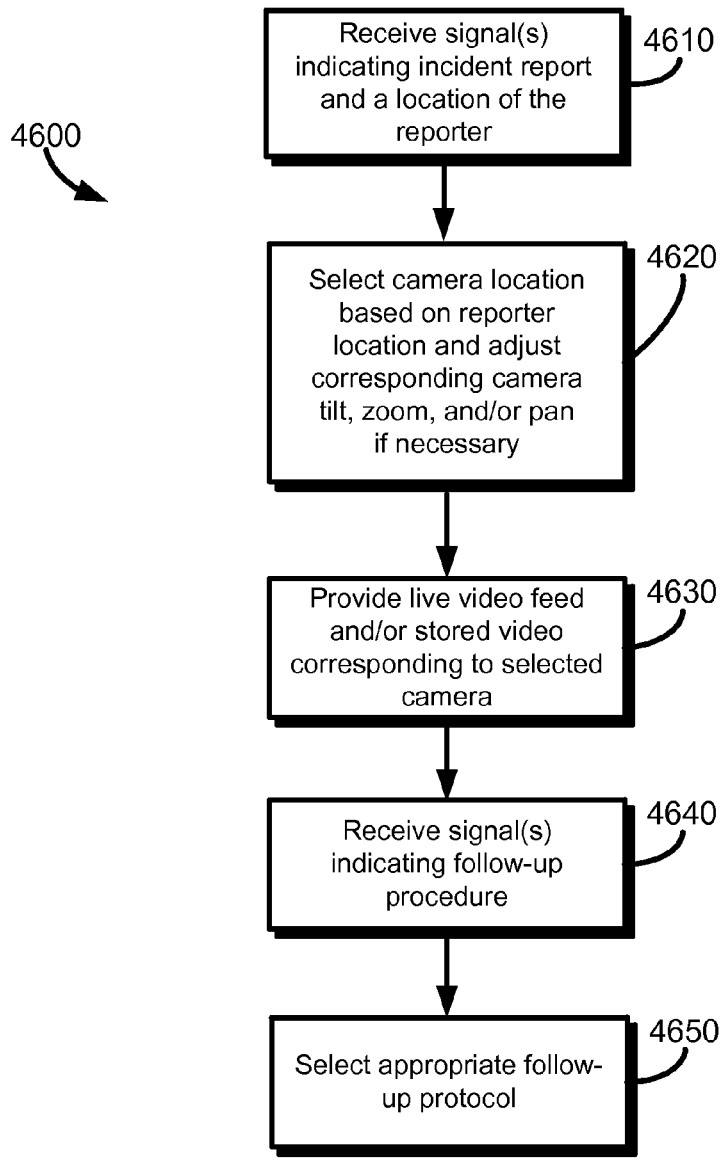

Referring to FIG. 46, there is shown a flow chart 4600 in which, at step 4610, the iCan manager 100 can receive one or more signals from one of the community users (e.g., residents, community members) to indicate that an incident is being reported. The indication can provide information as to the type of the incident that is believed to have taken place or that is believed to be taking place. Such signals may be generated in response to a community user providing information to a graphical user interface generated by the iCan manager and made available at a pre-determined website and/or via an application.

The iCan manager 100 can also receive location information corresponding to the community user. For example, when the community user is a mobile community user, the location information can be in the form of GPS signals indicating a position fix of a mobile device or portable device. As a further example, when the community user is a mobile community user and may be indoors without GPS access, the location information can be in the form of WiFi or other network signals indicating a position fix of a mobile device or portable device, or at least indicating a general location of a mobile device or portable device (e.g., based on the location of the network to which the mobile device or portable device is coupled). In another example, when the community user is a stationary community user, the location information can be an IP address indicating the location of a desktop.

At step 4620, based on the information received in step 4610, the iCan manager 100 can select one or more cameras (e.g., surveillance cameras 106) and can generate signals to control one or more of a tilt, zoom, and pan of each of the selected cameras to orient the cameras in the direction of the incident being reported.

At step 4630, the iCan manager 100 can provide a live video feed of the selected cameras to police or security personnel accessing the iCan manager 100 via a website or other application. The iCan manager 100 can also provide previously stored video content corresponding to the one or more selected cameras in response to a signal received requesting such content. For example, police or security personnel may generate a request for such content to get better context of the events that lead to the incident being reported.

At step 4640, the iCan manager 100 can receive one or more signals that indicate the type of follow-up procedure that is to be used to address the reported incident. At step 4650, the iCan manager 100 can select one of a plurality of protocols to follow for a particular procedure.

Figure 47:
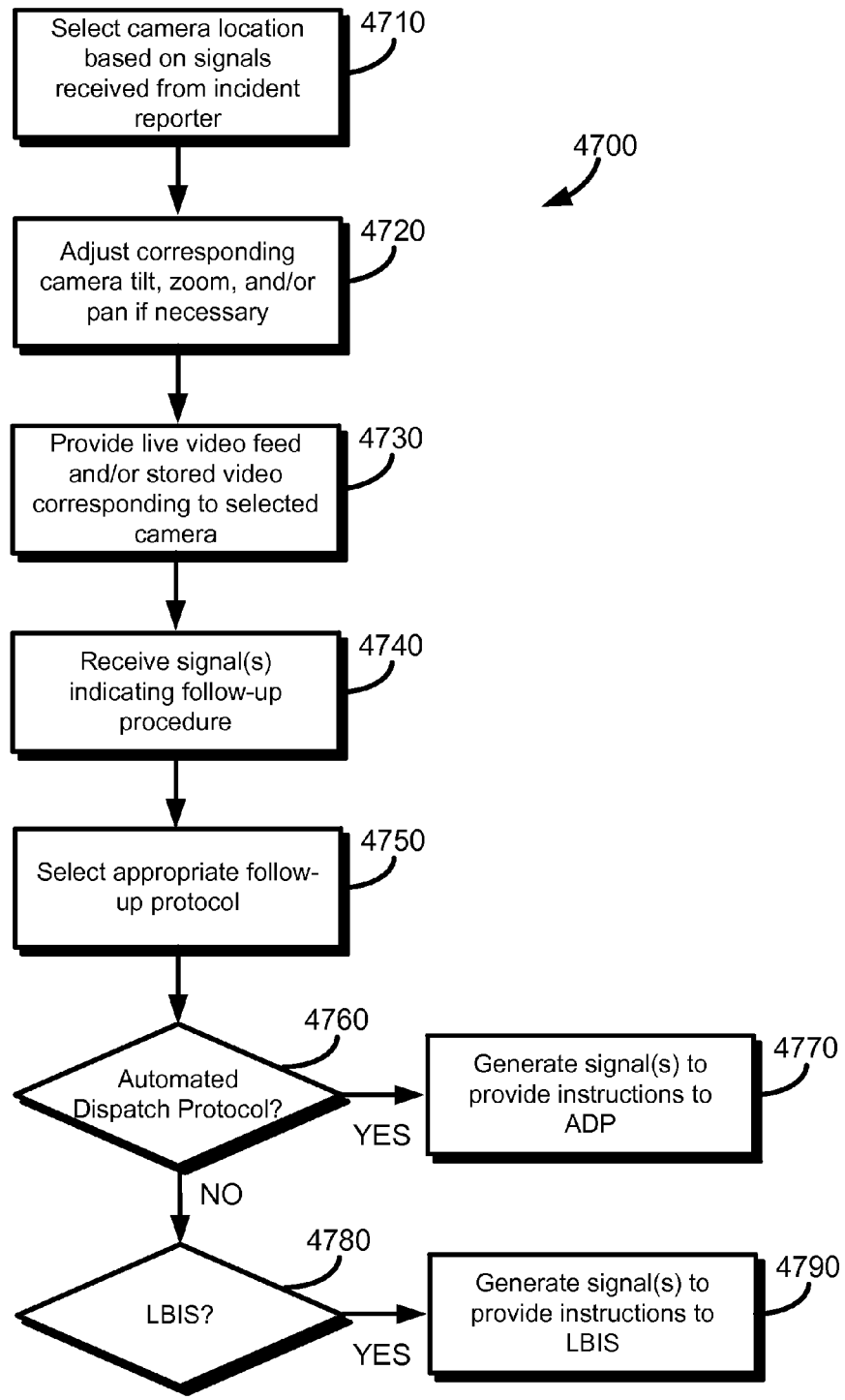

Referring to FIG. 47, there is shown a flow chart 4700 in which, at step 4710, the iCan manager 100, after receiving the appropriate incident reporting information from one or more community users, can select one or more cameras (e.g., surveillance cameras 106). At step 4720, the iCan manager 100 can generate signals to control one or more of a tilt, zoom, and pan of each of the selected cameras to orient the cameras in the direction of the incident being reported. Accordingly, the iCan manager 100 can determine the appropriate tilt, zoom, and pan for each selected camera. When a camera is properly oriented, the iCan manager 100 can leave that camera in its current position.

At step 4730, the iCan manager 100 can provide a live video feed of the selected cameras to police or security personnel accessing the iCan manager 100 via a website or other application. The iCan manager 100 can also provide previously stored video content corresponding to the one or more selected cameras in response to a signal received requesting such content.

At step 4740, the iCan manager 100 may be operable to receive one or more signals that indicate the type of follow-up procedure that is to be used to address the reported incident.

At step 4750, the iCan manager 100 can select one of a plurality of protocols to follow for a particular procedure.

At step 4760, the iCan manager 100 may determine whether coordination with the automated dispatch protocol 102 is enabled and/or supported. When the operation of the iCan manager 100 with the automated dispatch protocol 102 is supported and enabled or activated, the iCan manager 100, at step 4770, may be operable to generate one or more instruction signals to be communicated to the automated dispatch protocol 102 to dispatch the appropriate personnel to respond to the incident reported. When such operation is not supported or not enabled, the process may proceed to step 4780.

At step 4780, the iCan manager 100 may be operable to determine whether coordination with the LBIS 104 is enabled and/or supported. When the operation of the iCan manager 100 with the LBIS 104 is supported and enabled or activated, the iCan manager 100, at step 4790, can generate one or more instruction signals to be communicated to the LBIS 104 to orient the light-based intervention devices in the direction of the incident being reported. Moreover, the instructions can indicate the characteristics of the intervention such as light intensity, pattern, messages, sounds, or the like.

Figure 48:
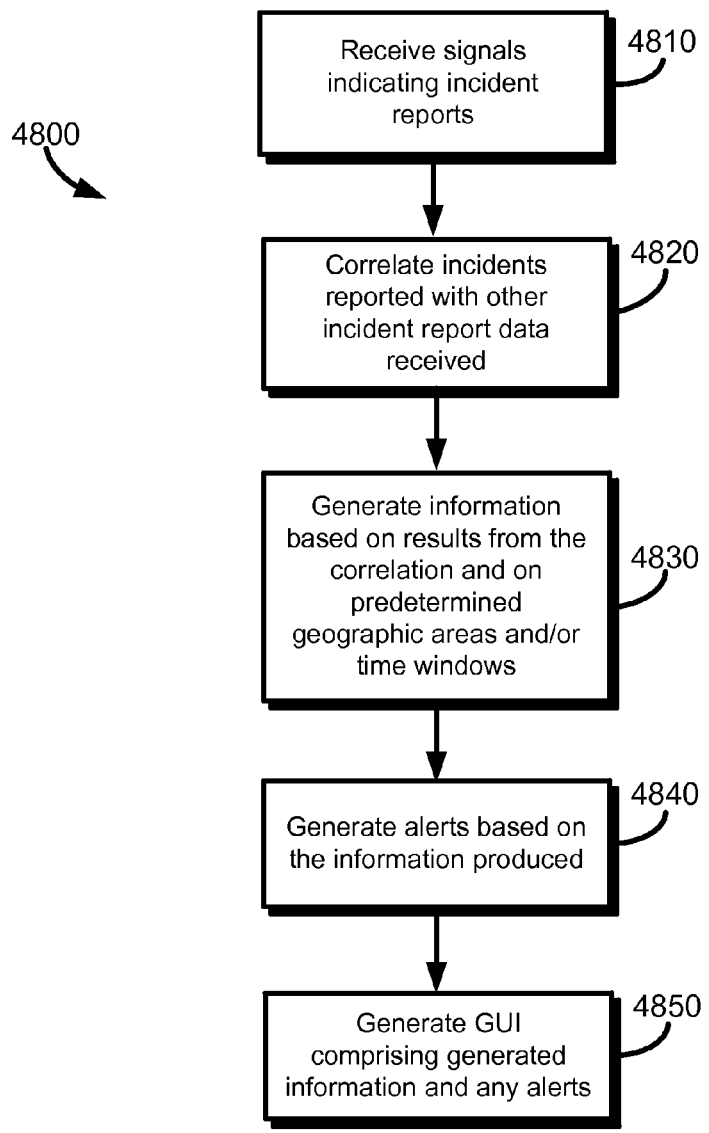

Referring to FIG. 48, there is shown a flow chart 4800 in which, at step 4810, the iCan manager 100 can receive signals indicating incident reports. Those signals may be from one or more community users and can indicate more than one incident being reported. Moreover, the indication may provide information as to the type of the incident that is believed to have taken place or that is believed to be taking place. The iCan manager 100 may store some or all of this information in the memory module 230 and/or in another memory system (e.g., database) connected to the iCan manager 100 via the interface module 210.

At step 4820, the iCan manager 100 may be operable to correlate the incidents reported with other incident report data. For example, the iCan manager 100 may identify trends in the types of the incident, the location of the incidents, and/or the timing of the incidents from reports received and/or from additional information received.

At step 4830, the iCan manager 100 may use the results from step 4820 to generate information about the incidents that are being reported for a predetermined geographic area and/or a time window. For example, the iCan manager 100 can generate hourly, daily, weekly, and/or monthly reports that comprise the types of the incidents, their frequency, and specific locations within a certain community. These reports can also identify the types of trends noted above. At step 4840, the iCan manager 100 can generate alerts based on the information collected and analyzed in steps 4810-4830.

At step 4850, the iCan manager 100 can generate a graphical user interface that comprises the generated information and/or the generated alerts for distribution to users of the iCan system 10, including community members and police or security personnel.

In accordance with an embodiment of the disclosure, a smartphone app may be provided and utilized to generate incident reports, which may be handled by the iCan system 10. When activated, the smartphone app may be utilized to report and/or provide a location of a reported incident. The location may be translated or converted to a street address and plotted on, for example, a police iCan electronic map.

Since the smartphone is a mobile device, in some instances, the smartphone may not be located within an iCan service area when reporting an incident. In this regard, no iCan panoramic map is available to be presented by the smartphone app to aid in determining the approximate location of the reported incident. Accordingly, cellular signals and/or GNNS signals may be utilized to determine the location of the reported incident. In instances where there are reciprocal agreements and connectivity with other iCan systems and the smartphone device is located in a service area of one of those other iCan systems, then iCan-based services may be provided to the smartphone through those other iCan systems to aid with localizing a reported event.

In instances when the smartphone may be located within the service area of a home iCan system 10, then the app may utilize various street view maps and/or panoramic views to assist with localizing the reported incident.

The smartphone app may enable users to activate a panic mode and/or a message mode of operation. In panic mode, a user may not be able to call an emergency number, for example 911. This may be due to a variety of reasons. For example, the user of the smartphone is being chased, hiding, being attacked, imminent danger, or other similar type of reasons. The iCan system 10 is operable to localize the incident and may transmit one or more panic alerts to the police or other policing authority. The police or other policing authority may receive the panic alert on the iCan incident management screen and is provided with pedigree information and/or description of registered users to increase situational awareness for the responding police or security officers and locating reporter.

The incident location may be plotted on a base map GPS automated vehicle tracking system or other mapping system. The map shows the location and viewing areas of public surveillance cameras 106, if any, which may be located in close proximity to the reported incident the areas. The police may orient local surveillance cameras towards the reported incident location in order to assist with a search of the reporter of the incident. The content or feed from the cameras covering the reported incident may be viewed by clicking on the camera icon and/or manually viewing the camera view. When integrated with public CCTV camera systems, the iCan mobile app may automatically alert the police or other policing authority to the presence of local CCTV cameras within close proximity of the incident and may cause those CCTV cameras to be automatically oriented toward the incident location through a series of local permissions or authorizations from the owners/controllers of those CCTV cameras.

The police or policing authority may transit alert acknowledgement to the smartphone of the reporter of the incident. The reporter of the incident and the police or policing authority may communicate during the incident through messaging, for example, SMS message, or through the smartphone app. Text, video and/or audio may be communicated between the reporter of the incident and the police or policing authority. In instances where, for example, a person may be hiding or is being chased, the police or policing authority may activate a camera and/or microphone to view and/or listen to what is happening with the reported incident.

The police or policing authority may dispatch the police or security patrol units to area of the reported incident using automated emergency dispatch (AED) or traditional dispatch protocols. When integrated with AED and/or CAD, the system automatically generates a dispatch transaction and dispatches the closest or area police/security unit to the event.

The iCan system 10 is operable to actively track the movements of the reporter of the incident. In this regard, the location of the reporter may be determined and/or updated (pinned) every x seconds to ascertain movement and localizing the reported incident on the police or policing authority mapping system. The event map icon displays appropriate incident ID features to distinguish between multiple events.

In the message mode of operation, a user of the smartphone app may utilize a combination of drop down menu selections, and pre-scripted and freehand text within the iCan phone application, to communicate with the police or policing authority. The iCan system 10 is operable to localize reported events using cellular signals and/or GNSS signals and transmits one or more alerts to the police. The message mode of operation may comprise other features that are similar to those disclosed above for the panic mode.

The particular iCan system may be operable to provide service outside of its home coverage areas based on reciprocal agreements and connectivity with other iCan system providers. For example, iCan system A may have reciprocal agreements and connectivity with iCan system B, iCan system C and iCan system D. In this regard, the reciprocal agreements and connectivity enables sharing of data and resources amongst each of the iCan systems A, B, C and D.

These reciprocal agreements and connectivity may enable the grouping of adjoining law enforcement agencies. This grouping of adjoining law enforcement agencies may provide a much larger network of alerting services, which may be utilized to protect the residents or community members in the areas that are serviced by the group of adjoining law enforcement agencies.

The message mode of operation may be utilized for routine on-demand contact with the police. In the message mode, alerts may be sent to customers' home iCan system, the latter of which may notify the appropriate policing agency or send the alerts on to the local police.

In accordance with various embodiments of the disclosure, an interactive community alert network system is operable to receive one or more signals indicating a report of an incident. The iCan system 10 may determine a location of the reported incident. One or more visual and/or audio capture devices such as the surveillance cameras 106, which may be within proximity of the determined location of the reported incident may be adjusted. Corresponding visual and/or audio content of the reported incident may be captured from the one or more adjusted visual and/or audio capture devices such as the surveillance cameras 106. The captured corresponding visual and/or audio content of the reported incident may be utilized to determine how to handle the reported incident.

The location of the reported incident may be determined based on a position of a device that may be utilized to report the incident and/or localization through the use of one or more electronic mapping systems or panoramic still images of CCTV camera views. In this regard, the location of the incident may be determined based on a global navigation satellite system position of the device utilized to report the incident. Information within the report of the incident may also be utilized to determine the location of the incident.

The iCan system 10 may be operable to determine whether the report of the incident specifies that there is a crime in progress. The iCan system 10 may also be operable to dispatch a policing authority to the determined location of the reported incident if the report of the incident specifies that there may be a crime in progress or other incident requiring police intervention. The iCan system 10 may also notify a reporter of the incident to call an emergency number such as 911 to report the crime in progress.

The iCan system 10 may be operable to collect incident statistics and update one or more incident statistical parameters based on the reported incident. One or more reports may be generated based on the one or more incident statistical parameters. Community members may view these reports. The reports may be generated based on time and/or location.

The iCan system 10 may be operable to generate, on a graphical user interface (GUI), a map of the determined location of the reported incident. At least a portion of the corresponding visual and/or audio content of the reported incident may be displayed on the graphical user interface. A reporter of an incident may receive an acknowledgement of the report of the incident from a policing authority that handles the report of said incident. The acknowledgement may be communicated to the reporter of the incident via the iCan system 10.

In accordance with an embodiment of the disclosure, the received one or more signals that indicates a report of an incident may be communicated from an app running on, for example, a mobile community user device 120, 122, which may comprise a smartphone. In this regard, the location of the reported incident may be determined based on information communicated by the app on the smartphone. The app running on the smartphone may comprise a panic mode of operation and a message mode of operation. If the smartphone is outside an operating range of the interactive community alert network system 10, which may be referred to as a home interactive community alert network system, the app running on the smartphone may be operable to communicate with one or more other interactive community alert network systems. The app may communicate through those one or more other interactive community alert network systems in order to reach and communicate with the home interactive community alert network system 10.

Figure 49:
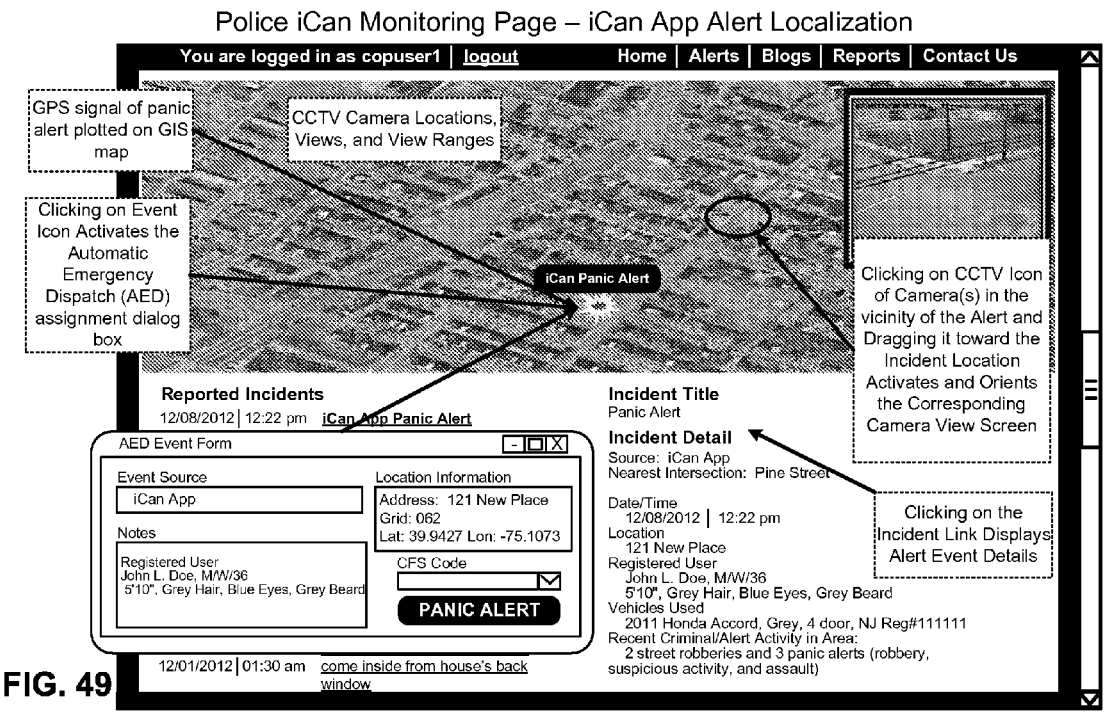
FIG. 49 is a diagram that shows an exemplary iCan app and a corresponding police iCan monitoring page when a panic alert is triggered by the iCan app, in accordance with an embodiment of the disclosure.

FIG. 49 is a diagram that shows an exemplary iCan app and a corresponding police iCan monitoring page when a panic alert is triggered by the iCan app, in accordance with an embodiment of the disclosure. Referring to FIG. 49, panic alert incident is generated by the iCan app and the police iCan monitoring page displays the panic alert incident. The panic alert incident may, for example, be displayed in red on the police iCan monitoring page. When the police or other user of the iCan system clicks on the link for the panic alert incident, details for the panic alert are displayed police iCan monitoring page.

The location information of the panic alert incident is also communicated by the app to the police or other user of the iCan system, where the location is plotted at the corresponding geographical coordinated on a GIS map displayed on the iCan monitoring page. An iCan panic alert icon may also be displayed at the geographical coordinates of the panic alert incident on the GIS map. The police or other user of the iCan system may click on the iCan panic alert icon to activate an automated emergency response assignment dialogue box.

Another embodiment of the disclosure may provide a non-transitory machine and/or computer readable storage and/or medium, having stored thereon, a machine code and/or a computer program having at least one code section executable by a machine and/or a computer, thereby causing the machine and/or computer to perform the steps as described herein for an interactive community alert network.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in an interactive community alert network system having as members multiple citizens or residents of an associated community:
receiving, from a communications device associated with one of the members, one or more signals indicating a report of an incident identified by the one member as taking place in the community;
identifying, in response to the one or more signals, an electronic map illustrating at least a portion of the community;
providing the map for display by the communications device;
receiving, from the communications device, an input indicating a location of the incident on the map, wherein the input is generated in response to the one member selecting the location from the map when the map is displayed by the communications device;
adjusting an orientation of one or more surveillance cameras within proximity of the location of the reported incident such that the one or more surveillance cameras turn toward and focus on the location of the incident;
capturing, from the adjusted one or more surveillance cameras, corresponding visual content of the reported incident, wherein the captured corresponding visual content of the reported incident is utilized to determine how to handle the reported incident;
providing feedback for display by the communications device, wherein the feedback includes information about police or security personnel activities associated with handling the reported incident; and
generating a community activity report to be provided to the members, wherein the community activity report includes activity information associated with the handling of the reported incident.

2. The method according to claim 1, wherein the electronic map is generated from one or more electronic mapping systems and/or panoramic still images of camera views.

3. The method according to claim 1, wherein police or security personnel activities associated with handling the reported incident include dispatching a policing authority to the location of the reported incident when the incident is determined to involve a crime in progress.

4. The method according to claim 1, comprising updating one or more incident statistical parameters based on the reported incident, wherein the one or more incident statistical parameters are included in the community activity report.

5. The method according to claim 1, wherein the community activity report is generated weekly or monthly.

6. The method according to claim 1, comprising presenting for display at a graphical user interface, at least a portion of the visual content of the reported incident captured by the adjusted one or more surveillance cameras.

7. The method according to claim 1, comprising generating an acknowledgement that the report of the incident has been received and is to be handled by the police or security personnel.

8. The method according to claim 7, comprising communicating the acknowledgement to the communications device.

9. The method according to claim 1, comprising proving a text screen for display by the communications device to enable collaborating between the one member and the police or security personnel during the handling of the incident by the police or security personnel.

10. The method according to claim 1, wherein the communications device is a smartphone and the one or more signals are communicated from an app running on the smartphone.

11. The method according to claim 10, wherein the app running on the smartphone comprises a panic mode of operation and a message mode of operation, and wherein the app is operating in the message mode during the handling of the incident.

12. The method according to claim 10, wherein the app running on the smartphone is operable to communicate with one or more other interactive community alert network systems when the smartphone is outside an operating range of the interactive community alert network system.

13. A system, comprising:
one or more processors for use in an interactive community alert network system having as members multiple citizens and residents of an associated community, the one or more processors being operable to:
receive, from a communications device associated with one of the members, one or more signals indicating a report of an incident identified by the member as taking place in the community;
identify, in response to the one or more signals, an electronic map illustrating at least a portion of the community;
provide the map for display by the communications device;
receive, from the communications device, an input indicating a location of the incident on the map, wherein the input is generated in response to the one member selecting the location from the map when the map is displayed by the communications device;
adjust an orientation of one or more surveillance cameras within proximity of the location of the reported incident such that the one or more surveillance cameras turn toward and focus on the location of the incident;
capture, from the adjusted one or more surveillance cameras, corresponding visual content of the reported incident, wherein the captured corresponding visual content of the reported incident is utilized to determine how to handle the reported incident;
provide feedback for display by the communications device, wherein the feedback includes information about police or security personnel activities associated with handling the reported incident; and generating a community activity report to be provided to the members, wherein the community activity report includes activity information associated with the handling of the reported incident.

14. The system according to claim 13, wherein the electronic map is generated from one or more electronic mapping systems and/or panoramic still images of camera views.

15. The system according to claim 13, wherein the police or security personnel activities associated with handling the reported incident include the dispatch of a policing authority to the location of the reported incident when the incident is determined to involve a crime in progress.

16. The system according to claim 13, wherein the one or more processors are operable to update one or more incident statistical parameters based on the reported incident, and the one or more incident statistical parameters are included in the community activity report.

17. The system according to claim 13, wherein the community activity report is generated weekly or monthly.

18. The system according to claim 13, wherein the one or more processors are operable to present for display at a graphical user interface, at least a portion of the visual content of the reported incident captured by the adjusted one or more surveillance cameras.

19. The system according to claim 13, wherein the one or more processors are operable to generate an acknowledgement that the report of the incident has been received and is to be handled by the police or security personnel.

20. The system according to claim 19, wherein the one or more processors are operable to communicate the acknowledgement to the communications device.

21. The system according to claim 13, wherein the one or more processors are operable to provide a text screen for display by the communications device to enable collaboration between the one member and the police or security personnel during the handling of the incident by the police or security personnel.

22. The system according to claim 13, wherein the communications device is a smartphone and the one or more signals are communicated from an app running on the smartphone.

23. The system according to claim 22, wherein the app running on the smartphone comprises a panic mode of operation and a message mode of operation, and wherein the app is operating in the message mode during the handling of the incident.

24. The system according to claim 22, wherein the app running on the smartphone is operable to communicate with one or more other interactive community alert network systems when the smartphone is outside an operating range of the interactive community alert network system.

* * * * *